US012697762B2

(12) United States Patent
Jaidka et al.

(10) Patent No.: US 12,697,762 B2
(45) Date of Patent: Aug. 4, 2026

(54) INJECTION MOLDING OF MULTILAYER ARTICLES WITH POST-PULLBACK PRESSURE MONITORING

(71) Applicant: Husky Injection Molding Systems Ltd., Bolton (CA)

(72) Inventors: Damish Jaidka, Brampton (CA); Douglas James Weatherall, Bolton (CA)

(73) Assignee: Husky Injection Molding Systems Ltd., Bolton (CA)

( * ) Notice: Subject to any disclaimer, the term of this patent is extended or adjusted under 35 U.S.C. 154(b) by 0 days.

(21) Appl. No.: 19/081,616

(22) Filed: Mar. 17, 2025

(65) Prior Publication Data

US 2025/0205949 A1      Jun. 26, 2025

Related U.S. Application Data

(62) Division of application No. 17/779,407, filed as application No. PCT/CA2020/051602 on Nov. 25, 2020, now Pat. No. 12,311,591.

(Continued)

(51) Int. Cl.
*B29C 45/77*          (2006.01)
*B29C 45/16*          (2006.01)
(Continued)

(52) U.S. Cl.
CPC .......... *B29C 45/77* (2013.01); *B29C 45/1684* (2013.01); *B29C 2945/76006* (2013.01);
(Continued)

(58) Field of Classification Search
CPC ........ B29C 45/1603; B29C 2949/3028; B29C 2949/302; B29C 2949/22; B29C 2949/24;
(Continued)

(56) References Cited

U.S. PATENT DOCUMENTS

| | | |
|---|---|---|
| 3,889,849 A | 6/1975 | Chandler, Jr. |
| 4,583,931 A | 4/1986 | Fujita et al. |

(Continued)

FOREIGN PATENT DOCUMENTS

| | | |
|---|---|---|
| JP | 2000-158482 A | 6/2000 |
| WO | WO 2008/047724 A1 | 4/2008 |

*Primary Examiner* — Armand Melendez
(74) *Attorney, Agent, or Firm* — Wolf, Greenfield & Sacks, P.C.

(57)                ABSTRACT

In one aspect, a method of molding a multilayer article comprises causing a surface layer material injection unit to commence injecting a surface layer material into a mold cavity via a surface layer material channel. Then, an internal layer material injection unit commences injecting an internal layer material into the mold cavity an internal layer material channel. Then, during application of a hold pressure upon the surface layer material in the surface layer material channel and with the surface and internal layer material injection units in fluid communication with one another, a pullback stroke is effected at the internal layer material injection unit. After a delay interval, at least one physical parameter indicative of a post-pullback pressure of the internal layer material is detected, and an indicator of pullback effectiveness is generated based on the post-pull-back pressure indicated by the at least one physical parameter relative to a threshold pressure.

9 Claims, 18 Drawing Sheets

Related U.S. Application Data

(60) Provisional application No. 62/952,527, filed on Dec. 23, 2019.

(51) Int. Cl.
    *B29C 45/76*     (2006.01)
    *B29L 9/00*     (2006.01)

(52) U.S. Cl.
    CPC ................. *B29C 2945/7618* (2013.01); *B29C 2945/76377* (2013.01); *B29C 2945/76498* (2013.01); *B29C 2945/76658* (2013.01); *B29L 2009/00* (2013.01)

(58) Field of Classification Search
    CPC ............ B29C 45/1643; B29C 45/1646; B29C 2949/3016; B29C 2949/3018; B29C 2949/3036; B29C 2949/303; B29C 2949/3032; B29C 45/1642; B29C 2949/3038; B29C 45/1607; B29C 45/2725; B29C 2045/1648; B29C 2949/0811; B29C 2949/0819; B29C 2949/0829; B29C 2949/3012; B29C 49/06; B29C 2045/273; B29C 2949/0715; B29C 2949/28; B29C 2949/3008; B29C 45/02; B29C 49/071; B29C 2949/082; B29C 2045/165; B29C 2045/1656; B29C 2049/023; B29C 2949/072; B29C 2949/073; B29C 2949/0777; B29C 2949/3026; B29C 2949/0723; B29C 2949/0724; B29C 2949/0732; B29C 2949/0733; B29C 2949/0773; B29C 2949/3022; B29C 45/0046; B29C 49/22; B29C 2045/161; B29C 2045/1612; B29C 2045/1614; B29C 2045/1668; B29C 2045/1685; B29C 2045/1698; B29C 2045/2687; B29C 2045/277; B29C 2045/2872; B29C 2793/009; B29C 2949/0774; B29C 2949/0817; B29C 2949/0835; B29C 2949/0837; B29C 2949/0872; B29C 2949/3009; B29C 45/1657; B29C 45/1684; B29C 49/0005; B29C 49/74; B29C 2045/0051; B29C 2045/1651; B29C 2045/166; B29C 2045/1667; B29C 2049/222; B29C 2049/7832; B29C 2049/7862; B29C 2049/7879; B29C 2949/077; B29C 2949/0772; B29C 2949/0816; B29C 2949/20; B29C 2949/26; B29C 2949/3014; B29C 2949/3034; B29C 2949/3074; B29C 2949/3076; B29C 37/0078; B29C 37/0082; B29C 45/13; B29C 45/16; B29C 45/164; B29C 45/1645; B29C 45/22; B29C 45/2708; B29C 45/2756; B29C 45/30; B29C 45/54; B29C 45/706; B29C 48/03; B29C 48/185; B29C 49/04; B29C 49/08; B29C 49/087; B29C 49/42394; B29C 49/6605; B29C 49/761
    See application file for complete search history.

(56) References Cited

U.S. PATENT DOCUMENTS

| | | |
|---|---|---|
| 4,717,324 A | 1/1988 | Schad et al. |
| 5,028,226 A | 7/1991 | De'ath et al. |
| 5,935,614 A | 8/1999 | Blank et al. |
| 7,972,544 B2 | 7/2011 | Okamoto et al. |
| 8,016,581 B2 | 9/2011 | Vasapoli et al. |
| 9,731,443 B2 | 8/2017 | Altonen et al. |
| 12,311,591 B2 | 5/2025 | Jaidka et al. |
| 2002/0055806 A1 | 5/2002 | Brown |
| 2005/0142245 A1 | 6/2005 | Chen et al. |
| 2005/0161847 A1 | 7/2005 | Weatherall et al. |
| 2006/0003040 A1 | 1/2006 | Sicilia |
| 2011/0108505 A1 | 5/2011 | Toyoda et al. |
| 2012/0070532 A1 | 3/2012 | Ten et al. |
| 2014/0117573 A1 | 5/2014 | Fitzpatrick |
| 2014/0203466 A1 | 7/2014 | Catoen et al. |
| 2014/0306365 A1 | 10/2014 | Duffy et al. |
| 2015/0014878 A1 | 1/2015 | Takeuchi et al. |
| 2015/0197054 A1 | 7/2015 | White et al. |
| 2016/0257047 A1 | 9/2016 | Maruyama |
| 2018/0029262 A1 | 2/2018 | Fitzpatrick |
| 2018/0133938 A1 | 5/2018 | Duffy et al. |
| 2022/0402186 A1 | 12/2022 | Jaidka et al. |

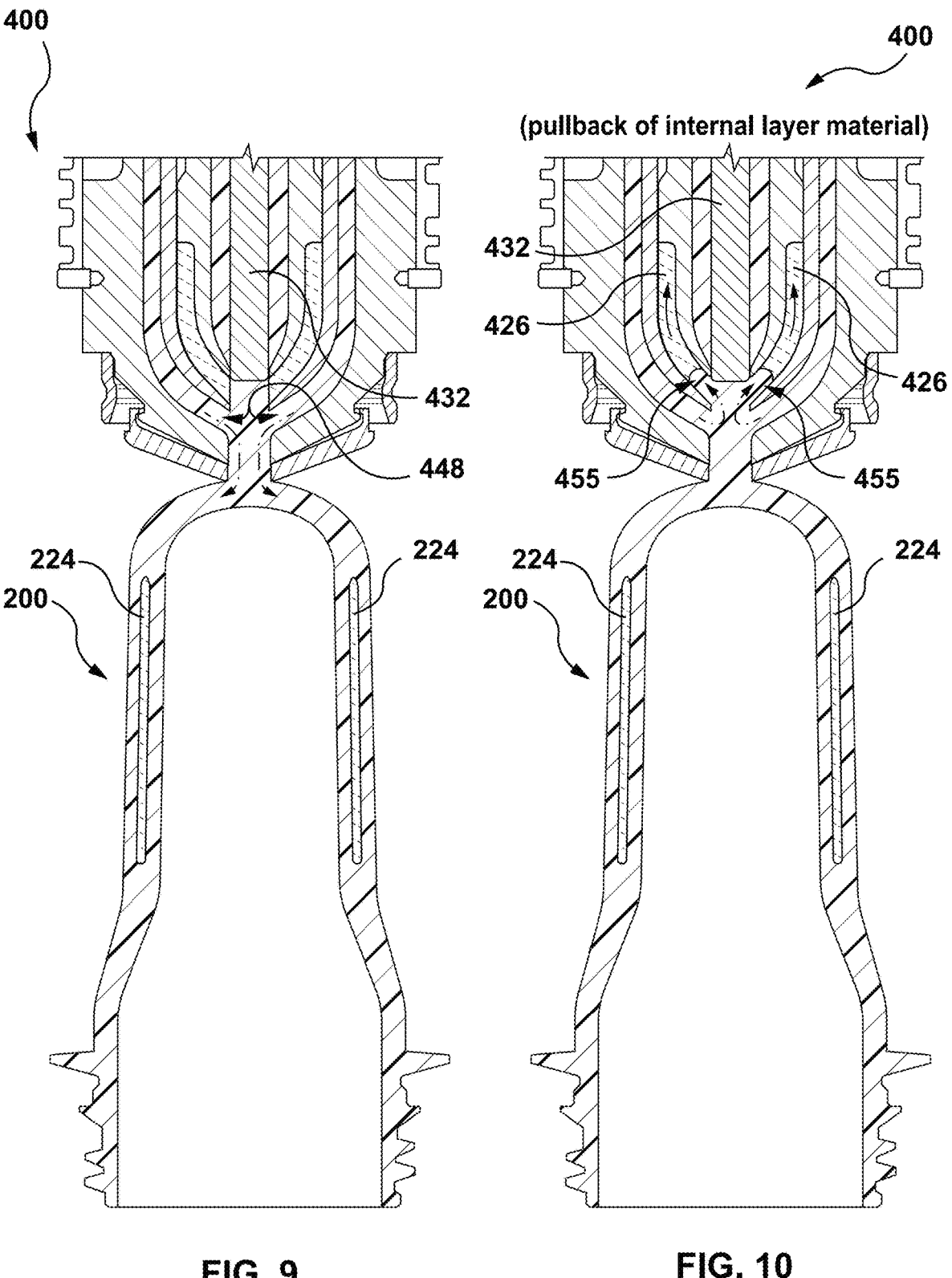
FIG. 9          FIG. 10

100'

106

104

108'

109'

102

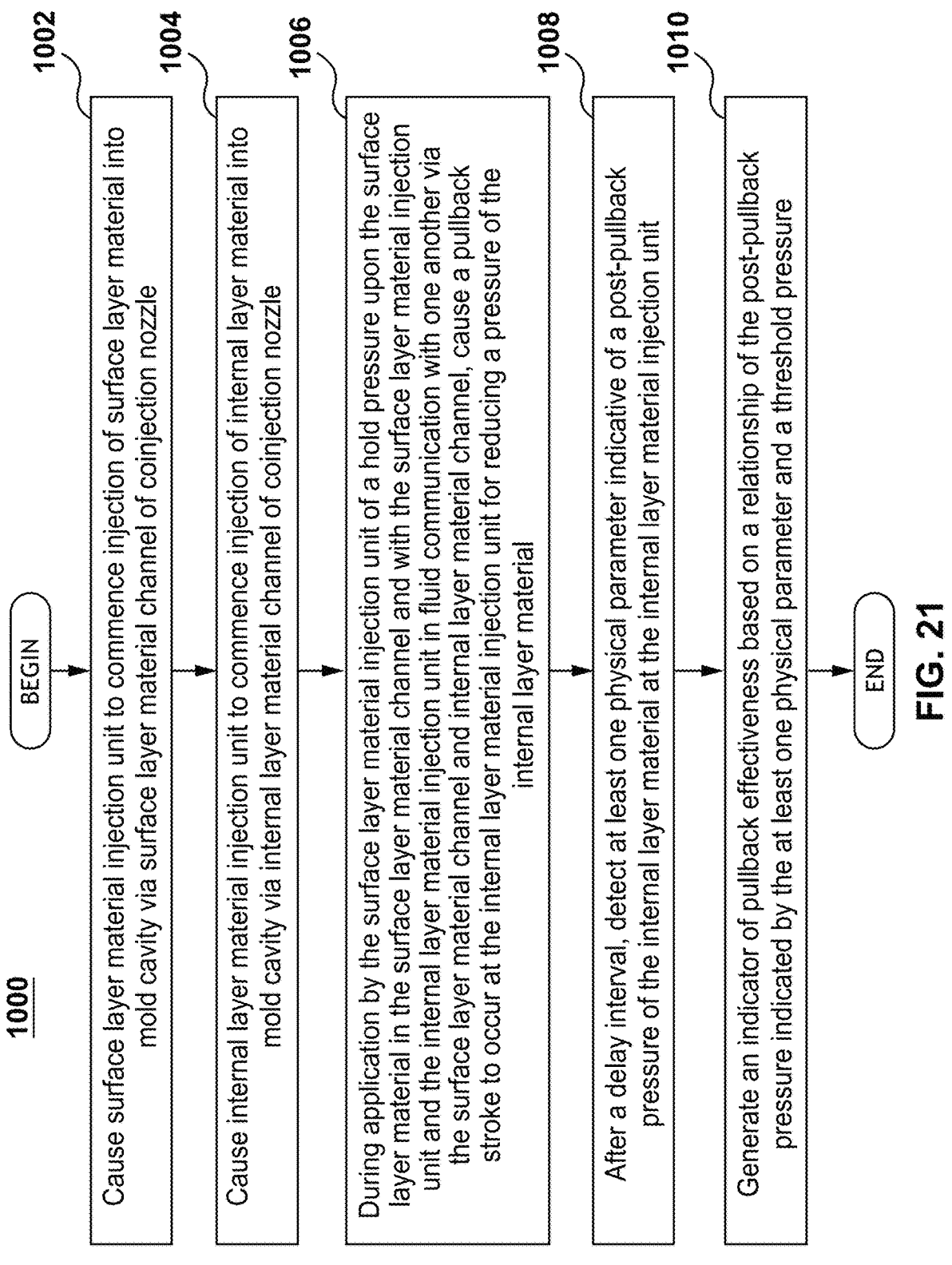

1000

1002 Cause surface layer material injection unit to commence injection of surface layer material into mold cavity via surface layer material channel of coinjection nozzle 1004 Cause internal layer material injection unit to commence injection of internal layer material into mold cavity via internal layer material channel of coinjection nozzle 1006 During application by the surface layer material injection unit of a hold pressure upon the surface layer material in the surface layer material channel and and with the surface layer material injection unit and the internal layer material injection unit in fluid communication with one another via the surface layer material channel and internal layer material channel, cause a pullback stroke to occur at the internal layer material injection unit for reducing a pressure of the internal layer material 1008 After a delay interval, detect at least one physical parameter indicative of a post-pullback pressure of the internal layer material at the internal layer material injection unit 1010 Generate an indicator of pullback effectiveness based on a relationship of the post-pullback pressure indicated by the at least one physical parameter and a threshold pressure

FIG. 21

INJECTION MOLDING OF MULTILAYER ARTICLES WITH POST-PULLBACK PRESSURE MONITORING

CROSS-REFERENCE TO RELATED APPLICATIONS

This Application is a division of U.S. application Ser. No. 17/779,407, filed May 24, 2022, titled "INJECTION MOLDING OF MULTILAYER ARTICLES WITH POST-PULLBACK PRESSURE MONITORING", which is a national stage filing under 35 U.S.C. § 371 of International Application PCT/CA2020/051602, filed Nov. 25, 2020, which claims the benefit under 35 U.S.C. § 119(e) of U.S. Provisional Application No. 62/952,527, filed Dec. 23, 2019, each of which is herein incorporated by reference in its entirety.

TECHNICAL FIELD

The present disclosure relates to injection molding of multilayer articles, and more particularly to injection molding of multilayer articles with post-pullback pressure monitoring.

BACKGROUND

A molding machine may channel a flow of melted molding material, such as melted plastic or resin, through a distribution network, such as a hot runner, for dispensing into a mold through a nozzle. Dispensing of the melted molding material may occur during injection molding for example. Melted molding material may be dispensed from a nozzle in a substantially annular or cylindrical flow. For example, an annular or cylindrical flow may be dispensed or injected into a mold cavity during injection molding of an article having a generally tubular shape, such as a preform suitable for subsequent blow-molding to form a container such as a plastic beverage bottle for example. The flow may be, or may become, annular as it enters the gate of the mold cavity and may spread to surround a core insert component of the mold cavity.

A multi-channel coinjection nozzle having multiple channels for simultaneously dispensing multiple respective layers of material may be used to form multilayer molded articles. For example, a coinjection nozzle may dispense annular inner and outer melt streams of a surface layer (or "skin layer") material simultaneously with an annular stream of an internal layer (or "core layer") material sandwiched between the inner and outer streams. The surface layer material may for example be polyethylene terephthalate (PET). The internal layer material may for example comprise nylon or a barrier material (e.g. an oxygen scavenger material) suitable for protecting subsequent contents of the molded article from external contamination (e.g. oxidation).

It may be desirable to incorporate an internal layer into only certain areas of a molded article, such as only in the body area (side wall) of a preform, and not in other areas, such as the closed base area or neck finish area of a preform. Moreover, it may be desirable to fully encapsulate the internal layer material within the surface layer material. For example, molded articles ultimately intended to contain a food or beverage may have an internal layer that is made from a non-food grade material, e.g. a material made from recycled plastic. If the internal layer were inadvertently exposed to an interior surface of the container, consumer safety may be compromised due to impurities in the non-food grade material.

It is normally undesirable for a surface layer of a multilayer molded article to delaminate and separate either from the molded article or from a container blow-molded therefrom. Such delamination and separation may be considered aesthetically unappealing. Moreover, if present on an interior side of a container wall, delamination and separation may compromise consumer safety, e.g. in the event that pieces of delaminated material break away into a contained food or beverage.

SUMMARY

According to one aspect of the present disclosure, there is provided an injection molding machine for molding a multilayer article, comprising: a coinjection nozzle having a surface layer material channel and an internal layer material channel; a surface layer material injection unit; an internal layer material injection unit; a mold cavity; and a controller operable to: cause the surface layer material injection unit to commence injecting a surface layer material into the mold cavity via the surface layer material channel; then cause the internal layer material injection unit to commence injecting an internal layer material into the mold cavity via the internal layer material channel; then, during application by the surface layer material injection unit of a hold pressure upon the surface layer material in the surface layer material channel and with the surface layer material injection unit and the internal layer material injection unit in fluid communication with one another via the surface layer material channel and internal layer material channel, cause a pullback stroke to occur at the internal layer material injection unit for reducing a pressure of the internal layer material; then, after a delay interval, detect at least one physical parameter indicative of a post-pullback pressure of the internal layer material at the internal layer material injection unit; and generate an indicator of pullback effectiveness based on a relationship of the post-pullback pressure indicated by the at least one physical parameter and a threshold pressure.

In another aspect of the present disclosure, there is provided a method of molding a multilayer article, comprising: providing a mold cavity, a surface layer material injection unit, an internal layer material injection unit, and a coinjection nozzle having a surface layer material channel and an internal layer material channel; causing the surface layer material injection unit to commence injecting a surface layer material into the mold cavity via the surface layer material channel; then causing the internal layer material injection unit to commence injecting an internal layer material into the mold cavity the internal layer material channel; then, during application by the surface layer material injection unit of a hold pressure upon the surface layer material in the surface layer material channel and with the surface layer material injection unit and the internal layer material injection unit in fluid communication with one another via the surface layer material channel and internal layer material channel, causing a pullback stroke to occur at the internal layer material injection unit for reducing a pressure of the internal layer material; then, after a delay interval, detecting at least one physical parameter indicative of a post-pullback pressure of the internal layer material at the internal layer material injection unit; and generating an indicator of pullback effectiveness based on a relationship of the post-pullback pressure indicated by the at least one physical parameter and a threshold pressure.

In a further aspect of the present disclosure, there is provided a tangible medium storing computer-readable program code that, upon execution by a controller of a molding machine having a mold cavity, a surface layer material injection unit, an internal layer material injection unit, and a coinjection nozzle having a surface layer material channel and an internal layer material channel, cause the controller to: cause the surface layer material injection unit to commence injecting a surface layer material into the mold cavity via the surface layer material channel; then cause the internal layer material injection unit to commence injecting an internal layer material into the mold cavity the internal layer material channel; then, during application by the surface layer material injection unit of a hold pressure upon the surface layer material in the surface layer material channel and with the surface layer material injection unit and the internal layer material injection unit in fluid communication with one another via the surface layer material channel and internal layer material channel, cause a pullback stroke to occur at the internal layer material injection unit for reducing a pressure of the internal layer material; then, after a delay interval, detect at least one physical parameter indicative of a post-pullback pressure of the internal layer material at the internal layer material injection unit; and generate an indicator of pullback effectiveness based on a relationship of the post-pullback pressure indicated by the at least one physical parameter and a threshold pressure.

Other features will become apparent from the drawings in conjunction with the following description.

DESCRIPTION OF THE DRAWINGS

The non-limiting embodiments will be more fully appreciated by reference to the accompanying drawings, in which:

FIGS. 6, 7, 8, 9, and 10 are schematic diagrams of the nozzle of FIG. 4 and an associated mold cavity in longitudinal cross section at various stages during a single injection molding cycle;

FIG. 21 is a flowchart of operation of a controller of the injection molding machine of FIG. 20 for molding multilayer articles with a reduced risk of defects;

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION OF THE NON-LIMITING EMBODIMENT(S)

In this document, any use of the term "exemplary" should be understood to mean "an example of" and not necessarily to mean that the example is preferable or optimal in some way. Terms such as "downwardly," "right," and "left" may be used to describe features of some embodiments in this description but should not be understood to necessarily connote an orientation of the embodiments during manufacture or use. The term "monitoring" as used herein may mean "periodically determining" and does not necessarily mean "continuously monitoring."

Figure 1:
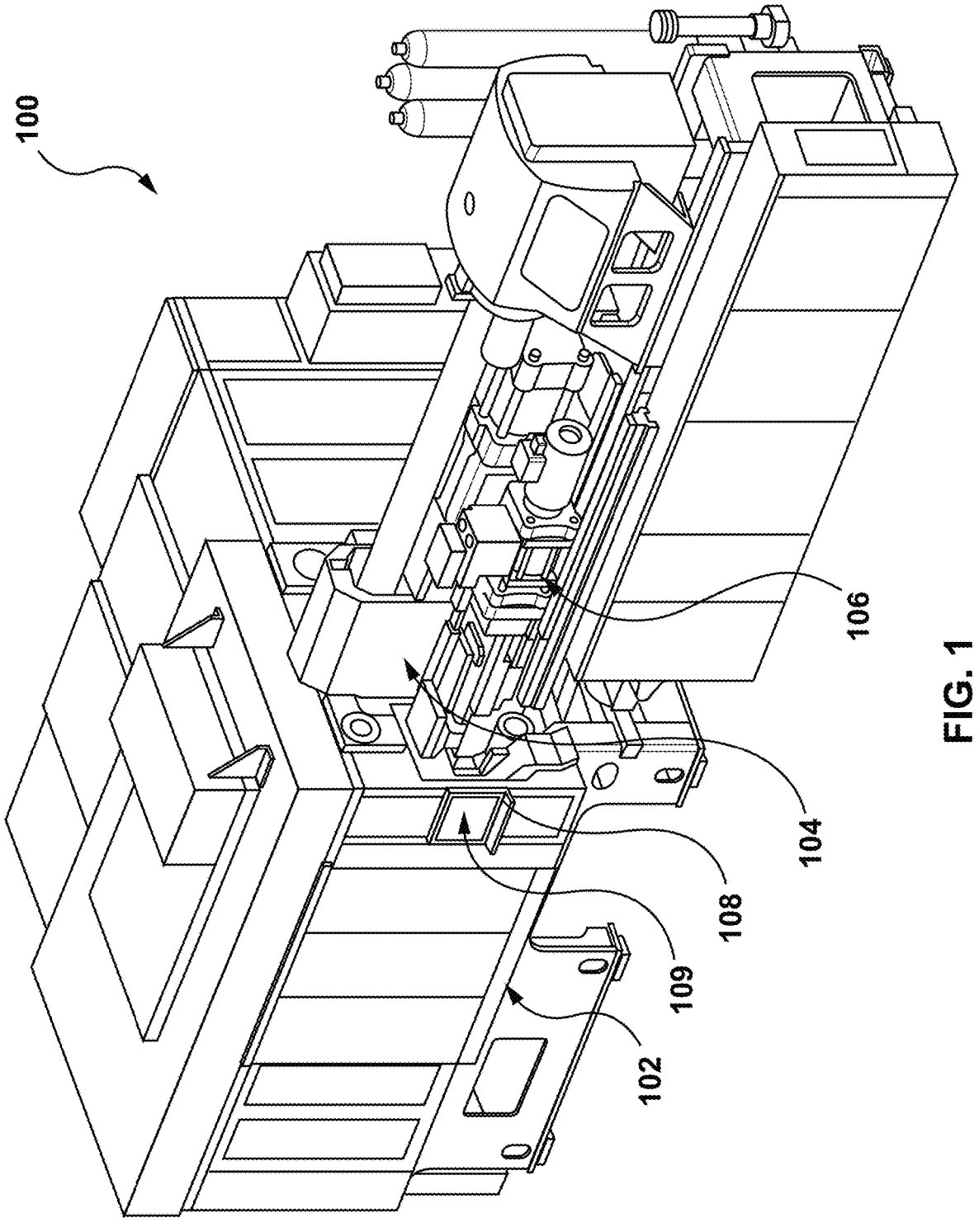
FIG. 1 is a perspective view of an injection molding machine for molding multilayer preforms.

FIG. 1 depicts an injection molding machine 100 in perspective view. The exemplary injection molding machine 100 is for molding multilayer articles, specifically preforms, such as the example preform 200 of FIG. 2 (described below).

The injection molding machine 100 depicted in FIG. 1 comprises an enclosure 102 housing a clamp unit, a fixed platen, a movable platen, and a mold mounted therebetween, none of which are visible in FIG. 1. The injection molding machine 100 further comprises first and second injection units 104 and 106, which are for plasticizing (melting) and injecting a surface layer material and an internal layer material respectively (both being forms of molding material) and which may accordingly be referred to herein as the surface layer material injection unit 104 and the internal layer material injection unit 106 respectively. The surface layer material may for example be PET. The internal layer material may for example be nylon, a barrier or oxygen-scavenging material, or a PET material with a colorant additive. In the present example, each of the injection units 104 and 106 comprises an extruder that uses a reciprocating screw as a driving element to inject molding material into mold cavities via a hot runner. The internal layer material injection unit 106 of the present embodiment is depicted in greater detail in FIG. 1A, described below.

The controller 108 of FIG. 1 controls the operation of injection molding machine 100 based on human operator input or based on a preset control sequence, among other functions. In the present embodiment, the controller 108 comprises at least one processor in communication with volatile or non-volatile memory storing computer-readable program code stored on a tangible medium, e.g., ROM, optical disk, USB drive, or magnetic storage medium. In some embodiments, the computer-readable program code may be transmitted to the memory via a modem or communications adapter communicatively coupled to a network, e.g. a wide area network such as the Internet. The controller 108 may for example be an industrial PC, e.g. a Beckhoff® model CP22xx Panel PC with Intel® Core™ i processor. Control instructions may be entered by a human operator via human-machine interface (HMI) 109, which may for example be a multi-function touchscreen that forms part of, or is coupled to, the controller 108. The HMI 109 may display various graphical user interface (GUI) screens used for controlling or monitoring aspects of the molding process pertaining to pullback at internal layer material injection unit 106, as will be described.

A hot runner within enclosure 102 defines a network of channels for conveying molten surface layer material and molten internal layer material from injection units 104 and 106 respectively to each of a plurality of multi-channel nozzles, described below. Each nozzle is positioned near an associated mold cavity defined in the mold. Each mold cavity is a negative shape (space) in the shape of the article to be molded, which in this example is preform 200 of FIG. 2. The number of mold cavities that can be simultaneously filled by molding machine 100 is typically greater than one and may vary between embodiments.

Figure 1A:
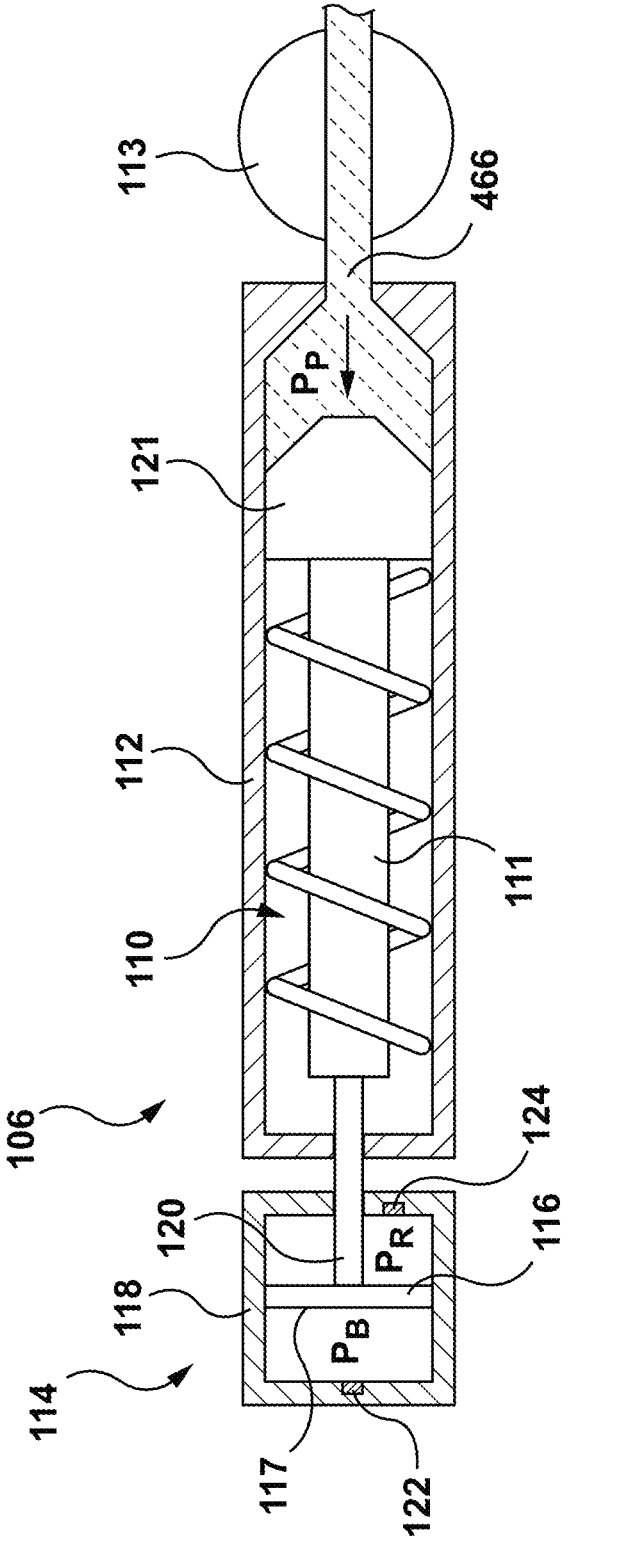
FIG. 1A is a schematic view of an injection unit component of the injection molding machine of FIG. 1.

FIG. 1A schematically depicts the internal layer material injection unit 106 of FIG. 1 in isolation from the other components of injection molding machine 100. Injection unit 106 comprises a helical reciprocating screw 110 (a form of driving element) housed in an extruder barrel 112. The barrel 112 can be selectively heated and has an inlet (not expressly depicted) for receiving internal layer material 466, e.g. in pellet form. The screw 110 is rotatable within the heated barrel 112 to mix and plasticize internal layer material. An outlet nozzle valve 113 can be selectively opened or closed by controller 108 (FIG. 1) to selectively establish fluid communication between the internal layer material injection unit 106 and the downstream hot runner. In FIG. 1A, the valve 113 is in the open position.

The injection unit 106 of FIG. 1A also comprises, or is otherwise associated with, an injection actuator 114. The injection actuator 114 (or simply "actuator 114") is configured to reciprocate the screw 110 longitudinally within the barrel 112 to effect injection and recovery phases of operation of internal layer material injection unit 106. In the present embodiment, the actuator 114 comprises a piston 116 housed in a hydraulic cylinder 118. The piston 116 is attached to a rod 120 that drives screw 110. The rod 120 may be an extension of a central shaft 111 of screw 110.

The depicted actuator 114 is controlled by controller 108. To commence injection of melted internal layer material 466, the controller 108 may cause a "bore-side" pressure $P_B$ acting upon on face 117 of piston 116 to exceed the sum of the "rod-side" pressure $P_R$ on the opposite side of the piston 116 (where $P_R$ may be zero or ambient pressure) and a plastic pressure Pp of melt pushing back upstream on the tip 121 of screw 110. A pair of pressure sensors 122 and 124 are configured (e.g. positioned and communicatively coupled with controller 108) to dynamically sense the bore-side pressure $P_B$ and rod-side pressure $P_R$ respectively and relay that information to the controller 108.

Figures 2, 3:
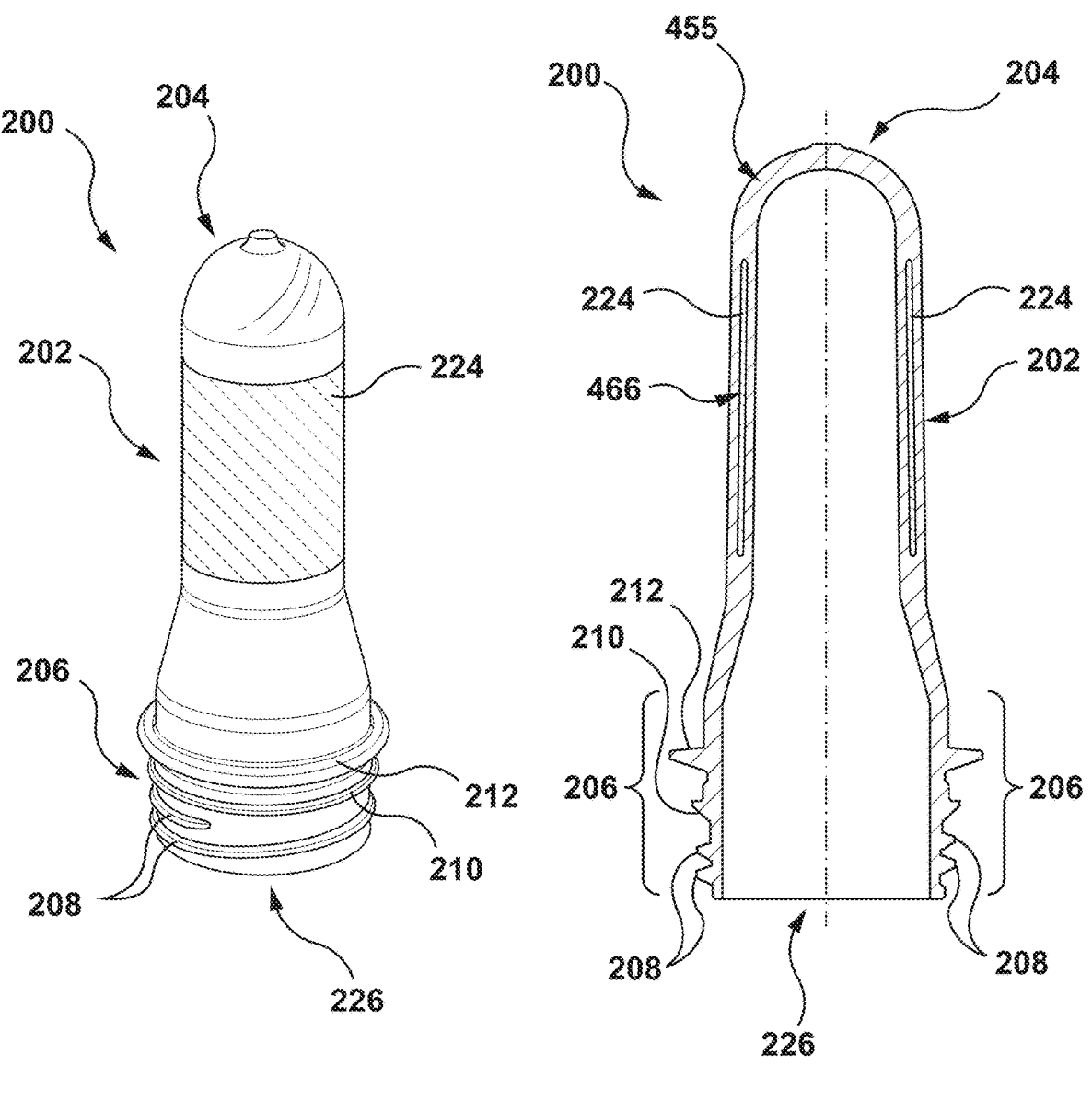
FIG. 2 is a perspective view of a multilayer preform molded by the injection molding machine of FIG. 1.
FIG. 3 is a longitudinal cross section of the preform of FIG. 2.

An example preform 200 produced by the injection molding machine 100 of FIG. 1 is shown in FIG. 2 in perspective view and in FIG. 3 in longitudinal cross section. As illustrated, the preform 200 has an elongate body 202, a hemispheric closed base 204, and a neck finish 206. The neck finish 206 of this example preform includes various external features including threads 208 for accepting and retaining a closure such as a threaded cap, an anti-pilfer bead 210, and a support ledge 212.

As best seen in FIG. 3, the preform 200 is made primarily from the surface layer material 455, with the exception of cylindrical internal segment 224, which is comprised of the internal layer material 466. The internal segment 224 is entirely encapsulated by the surface layer material 455 in the depicted embodiment. The orientation of the preform 200 in FIGS. 2 and 3 is inverted, i.e. the open end 226 opposite base 204 points downwardly. This is not necessarily the orientation in which preforms are molded in practice by molding machine 100 or alternative machine embodiments.

Figure 4:
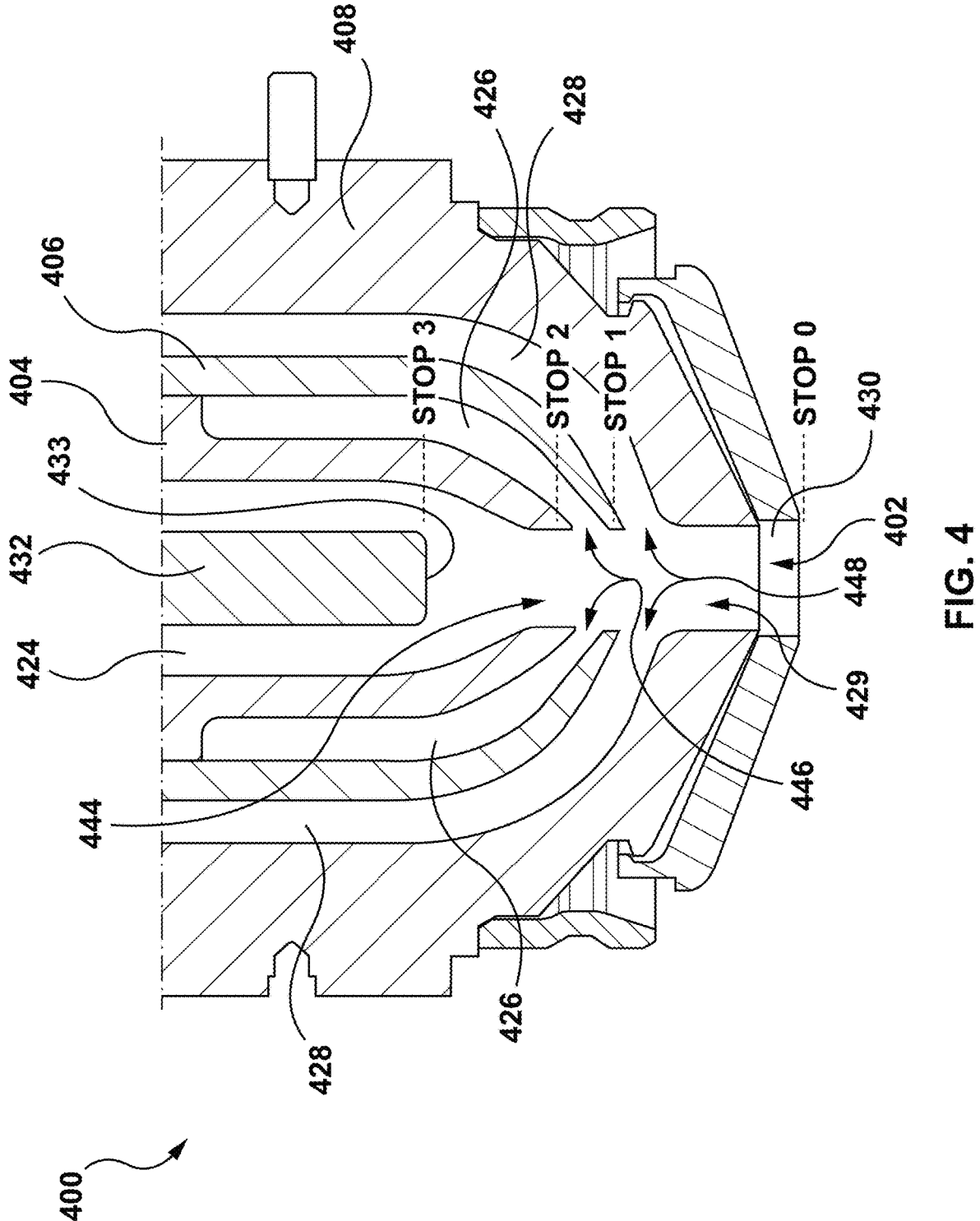
FIG. 4 is a longitudinal cross section of a portion of a hot runner coinjection nozzle used to inject molding material to form the preform of FIGS. 2 and 3.

The preform 200 of FIGS. 2 and 3 is formed from molten surface layer material 455 and molten internal layer material 466 injected into a mold cavity by an associated multi-channel coinjection nozzle 400 of the hot runner. FIG. 4 depicts a portion of the coinjection nozzle 400 in longitudinal cross section. The depicted portion of nozzle 400 is the downstream-most end of the nozzle, including the nozzle tip 402 from which melt is discharged into the mold cavity.

In the present embodiment, nozzle 400 is an assembly formed from three nested components: an innermost nozzle insert 404, an intermediary nozzle insert 406, and an outermost nozzle insert 408. In alternative embodiments, the nozzle may be formed in other ways, e.g. as a unitary component made using additive manufacturing techniques, such as direct metal laser sintering (DMLS). The example nozzle 400 has a substantially cylindrical shape, as does each of its component nozzle inserts 404, 406, and 408, but this is not a requirement.

Nozzle 400 of FIG. 4 defines three channels for conveying melt.

A first, centrally disposed channel 424 defined by the innermost nozzle insert 404 provides a passage for conveying melted surface layer material, received from the first injection unit 104, axially towards nozzle tip 402. Channel 424 also accommodates an axially reciprocable valve stem 432 that is used for controlling the flow of both types of melt (i.e. surface layer material and internal layer material) in the present embodiment, as will be described. Specifically, the channel 424 and valve stem 432 collectively define an annular passage through which surface layer material is flowable until the melt clears the end of valve stem 432 (when the valve stem 432 is in the fully retracted position of FIG. 4) and exits outlet 444 as a substantially cylindrical flow. Upon exiting outlet 444, the melt enters nozzle combination area 429 for combination with one or more other melt streams, as will be described. Channel 424 may be referred to as inner channel 424, and outlet 444 may accordingly be referred to as the inner outlet 444.

A second, substantially annular channel 426 is defined between the innermost nozzle insert 404 and the intermediary nozzle insert 406. The second channel 426 conveys melted internal layer material received from the second injection unit 106 axially towards an inwardly facing annular outlet 446. Upon exiting the annular outlet 446, the annular melt stream flows into nozzle combination area 429 for combination with one or more other melt streams. Channel 426 may be referred to as the intermediate channel 426, and outlet 446 may accordingly be referred to as the intermediate outlet 446.

A third, substantially annular channel 428 is defined between the intermediary nozzle insert 406 and the outermost nozzle insert 408. The third channel 428 conveys surface layer material received from the first injection unit 104 to inwardly facing annular outlet 448. Upon exiting outlet 448, the discharged melt enters nozzle combination area 429, where it may be combined with one or more other melt streams. Channel 428 may be referred to as the outer channel 428, and outlet 448 may accordingly be referred to as the outer outlet 448. In the present embodiment, the outer channel 428 is substantially concentric with each of the intermediate channel 426 and the inner channel 424.

It will be appreciated that, by virtue of the above-described nozzle structures, the inner, intermediate, and outer channels 424, 426, and 428 all supply or feed respective streams of molding material to the combination area 429, which may accordingly be referred to a "material combination area." By virtue of the material that they convey, the inner and outer channels 424, 428 may alternatively be referred to as surface layer material channels. Similarly, the intermediate channel 426 may alternatively be referred to as an internal layer material channel.

Valve stem 432 is used to control the flow of molding material into the combination area 429 and thus the mold cavity associated with nozzle 400. The valve stem 432 is controlled by controller 108 by way of an actuator (not depicted) that reciprocates the valve stem 432 between at least a subset of four positions or stops.

The first valve stem position is the fully opened position depicted in FIG. 4, in which the distal end 433 of the valve stem is positioned at axial "Stop 3." In this position, the valve stem 432 does not impede the flow of molding material from any of the inner outlet 444, intermediate outlet 446, or outer outlet 448. This valve stem position is referred to herein as Position 3, with the number 3 representing the number of open (unblocked) nozzle outlets (i.e. outlets 444, 446, and 448).

The second position is a mostly open position in which the end 433 of valve stem 432 is advanced (downwardly in FIG. 4) to the axial position marked as "Stop 2." When the valve stem 432 is in this position, it blocks (closes) inner outlet 444 and thereby prevents surface layer material from flowing therefrom. Intermediate outlet 446 and outer outlet 448 remain open. This valve stem position is referred to herein as Position 2, with the number 2 representing the number of open nozzle outlets (i.e. outlets 446 and 448).

The third position is a mostly closed position in which the end 433 of valve stem 432 is advanced to the axial position marked as "Stop 1" in FIG. 4. When the valve stem 432 is in this position, it blocks both of inner outlet 444 and intermediate outlet 446 and thereby prevents surface layer material and internal layer material, respectively, from flowing therefrom. Outer outlet 448 remains unblocked, permitting surface layer material from injection unit 104 to flow into combination area 429. This valve stem position is referred to as Position 1, reflecting the single nozzle outlet (outlet 448) that is open in this position.

Finally, the fourth position is a fully closed position in which the end 433 of valve stem 432 is advanced to the axial position marked as "Stop 0" in FIG. 4 within gate area 430. When the valve stem 432 is in this position, it blocks each of the inner outlet 444, intermediate outlet 446, and outer outlet 448, thereby preventing molding material from flowing from any of those outlets. This valve stem position may be referred to as Position 0, with the number 0 reflecting the number of open nozzle outlets (i.e. none).

In order to effectively block the flow of melt from outlets 444, 446, and/or 448, the clearance between the valve stem 432 and each of these outlets may for example be on the order of microns. The clearance may vary between embodiments based on, e.g., the viscosity of the melted molding materials in the respective channels 424, 426, and 428, the pressure of the melt within nozzle 400 immediately upstream of the valve stem 432, and other factors.

Figure 5:
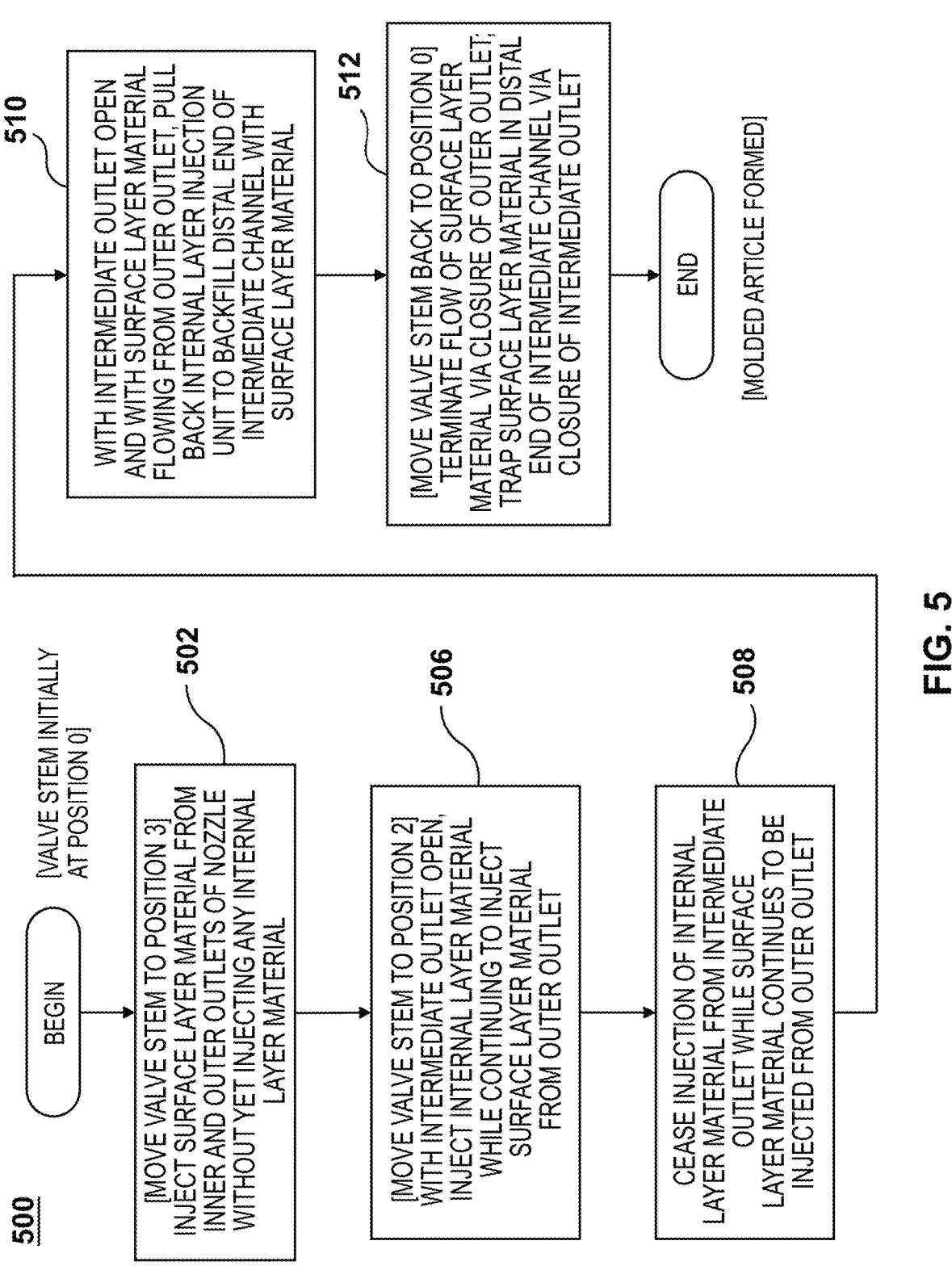
FIG. 5 is a flowchart of operation of the molding machine of FIG. 1 for forming the preform of FIG. 2 over the course of a single molding cycle.

Operation 500 of the molding machine 100 for coinjection of a multilayer molded article with an internal layer segment 224 during a single injection molding cycle is depicted in FIG. 5 in the form of a flowchart. Operation 500 will be described in conjunction with FIGS. 6-10, which schematically depict, in longitudinal cross section, a portion of the nozzle 400 of FIG. 4 and at least part of an associated mold cavity 800 at various stages of formation of a preform 200 during a single injection molding cycle.

Figures 6, 7:
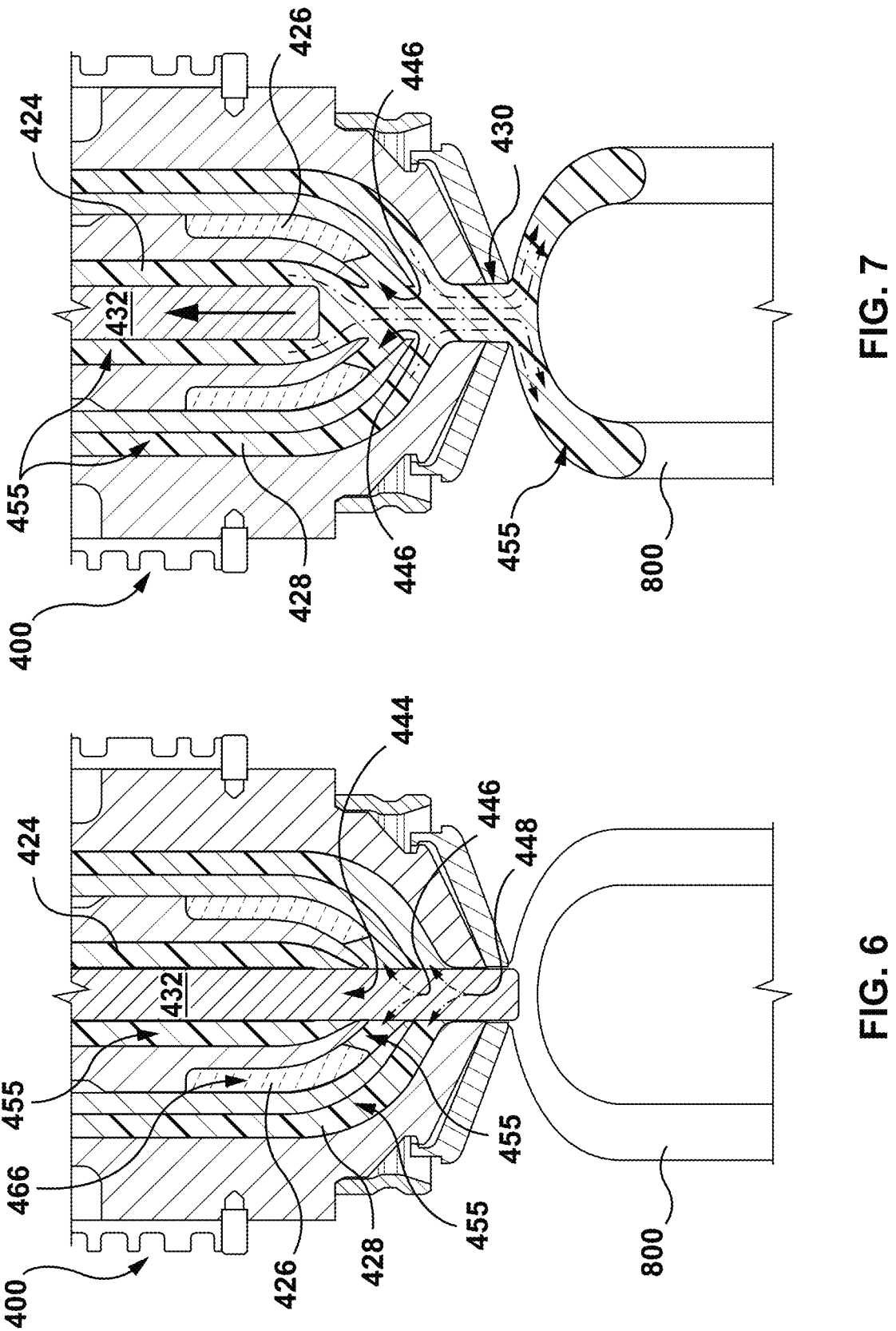

Referring to FIG. 6, at the beginning of an injection molding cycle, the valve stem 432 of nozzle 400 is in Position 0, i.e. the fully closed position. In that position, the valve stem 432 blocks (i.e. closes) the inner outlet 444, intermediate outlet 446, and outer outlet 448, thereby preventing any surface layer material 455 or any internal layer material 466 from flowing. The mold cavity 800 (shown only in part in FIG. 6) associated with the nozzle 400, which defines a negative space in the shape of preform 200, is initially empty, with any preform from a previous molding cycle having been ejected.

In the embodiment illustrated in FIG. 6, it can be seen that the distal end of intermediate channel 426, immediately upstream of intermediate outlet 446, initially contains a small amount of surface layer material 455. This is despite the fact that the intermediate channel 426 is intended to convey internal layer material 466 from injection unit 106 towards mold cavity 800. The manner in which the distal end of channel 426 is filled with surface layer material 455 at the end of the previous molding cycle and the rationale for doing so are described below.

Referring to FIG. 5, in a first operation 502, the valve stem 432 is moved from Position 0 (the fully closed position) to Position 3 (the fully open position), and injection of the surface layer material 455 by injection unit 104 (FIG. 1) is commenced. The surface layer material 455 is injected via both the inner and outer channels 424 and 428, in order to maximize the rate of flow and in turn minimize the duration of injection of operation 502. Notably, the other injection unit 106 is not yet activated in operation 502, i.e. no internal layer material is yet made to flow from the intermediate outlet 446. The initial flow of molding material is limited to only surface layer material 455 because it will ultimately occupy the neck finish area 206 of the preform 200, which should be kept free of any internal layer material in the present embodiment.

The state of the nozzle 400 and mold cavity 800 during operation 502 of FIG. 5 are depicted in FIG. 7. As illustrated, surface layer material 455 from both of the inner and outer channels 424 and 428 flows into mold cavity 800 via gate area 430. It will be appreciated that the stream of surface layer material 455 from the inner channel 424 flowing past intermediate outlet 446 may have a tendency to entrain or "drag" some of the material from outlet 446 along with it. Advantageously, to the extent that this does occur, the dragged material will also be surface layer material 455, in view of the small amount of surface layer material 455 occupying the distal end of channel 426. As such, the initial flow of surface layer material 455 during the current molding cycle is kept free from contamination by any internal layer material 466. It is for this reason that the distal end of intermediate channel 426 was filled with small amount of surface layer material 455 at the end of the previous injection molding cycle, using a mechanism that will be described below.

Figure 8:
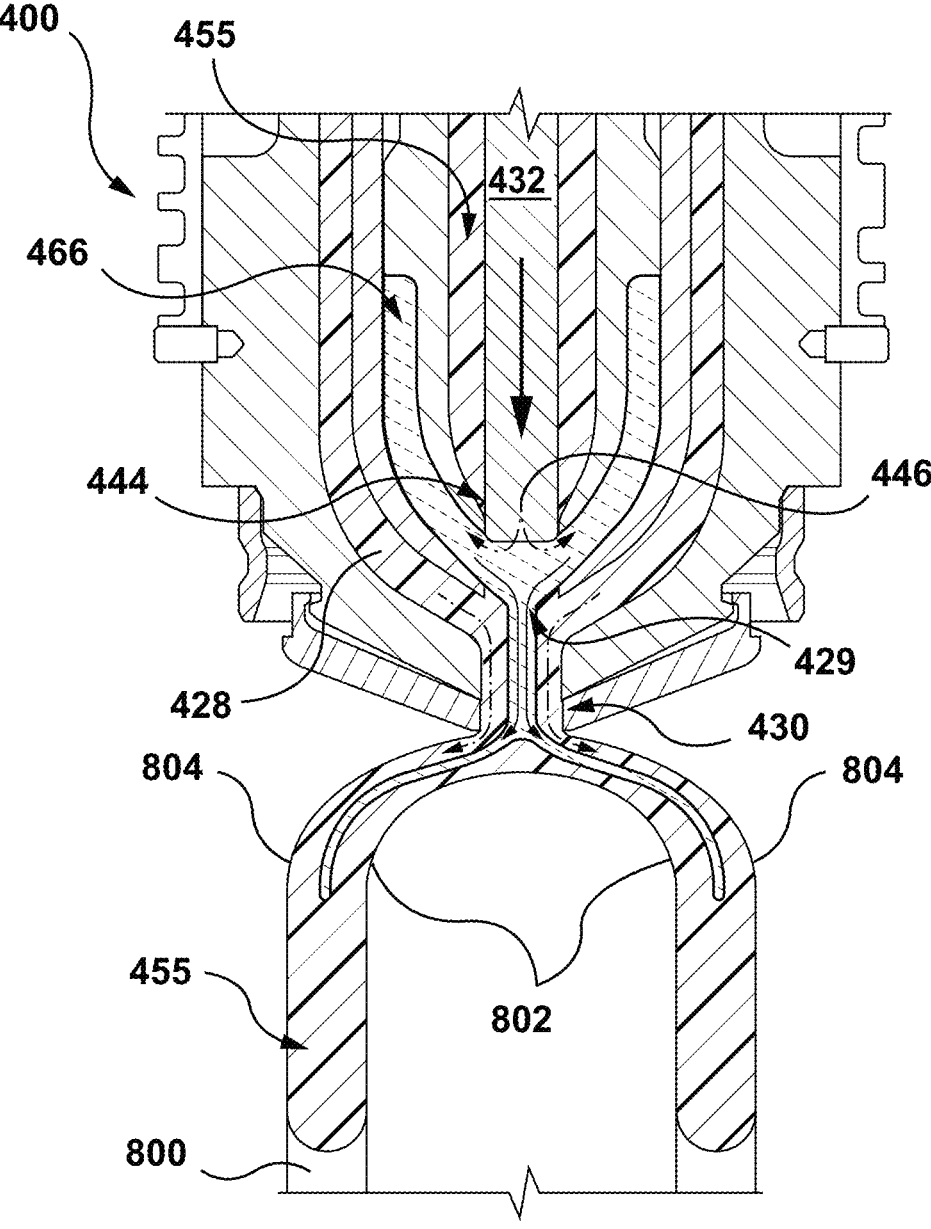

In a subsequent operation 506 (FIG. 5), controller 108 causes valve stem 432 to move to Position 2, as shown in FIG. 8. In addition, controller 108 triggers injection by injection unit 106 of internal layer material 466 into mold cavity 800 from the intermediate outlet 446 of nozzle 400, i.e. initiates injection of internal layer segment 224 (FIGS. 2 and 3). Referring to FIG. 1A, the triggering entails increasing the bore-side pressure $P_B$ of injection actuator 114 sufficiently to cause translation of the piston 116 and screw 110 in a downstream direction (i.e. to the right in FIG. 1A). Referring to FIG. 8, the internal layer material 466 entering the mold cavity 800 flows along with the surface layer material 455, which continues to be injected from outer channel 428.

In a subsequent operation 508 (FIG. 5), injection of internal layer material 466 from outlet 446 is terminated and the formation of the internal layer segment 224 is accordingly completed. Some minor "tailing" (thinning or tapering) of the trailing edge of the segment 224, which is not expressly depicted in FIG. 9 but is shown in FIG. 3, may occur. Surface layer material 455 continues to flow from outer outlet 448, which remains open. It will be appreciated that operations 506 and 508 of FIG. 5 collectively result in the formation of the internal layer segment 224 of FIGS. 2 and 3.

With formation of the internal layer segment 224 having been completed, controller 108 causes injection unit 104 to reduce the rate of surface layer material injection. This is done because, by this time, the mold cavity 800 has been nearly filled with molding material. The rationale for continuing to supply surface layer material injection is to fill any gaps that may form in the mold cavity 800 as the molded article (preform 200) cools, shrinks, and hardens over time.

With the intermediate outlet 446 open and with the surface layer material injection unit 104 in a "hold phase" in which surface layer material 455 is still under positive pressure and flowing (albeit slowly) from outer outlet 448, the controller 108 causes the internal layer material injection unit 106 to pull back slightly (operation 510, FIG. 5). The pullback has the effect of reducing a pressure of the internal layer material 466 within the extruder barrel 112 and the intermediate channel 426. The reduced pressure in turn allows a small amount of pressurized surface layer material 455 to flow into the distal end of intermediate channel 426. It will be appreciated that the direction of this flow is upstream, i.e. opposite to the normal direction of flow of intermediate layer material 466 through channel 426 during the injection phase (operation 506 of FIG. 5, described above). For this reason, the filling of the distal end the channel 426 with surface layer material 455 in operation 510 may be referred to as "backfilling." Backfilling is done for the reasons mentioned hereinabove.

Finally, in operation 512 (FIG. 5), the controller 108 causes valve stem 432 to return to its original, fully closed position, i.e. Position 0. This closure has the effect of trapping a small amount of surface layer material in the distal end of the intermediate channel 426, in preparation for the next molding cycle. In the result, the state of the nozzle 400 at the conclusion of operation 512 will be the same as its initial state of FIG. 6.

It will be appreciated that operation 500 of FIG. 5 could be implemented differently in alternative embodiments of the molding machine. For example, in operation 506, the stem 432 could be kept in position 3 rather than moved to position 2, with surface layer material 455 being injected from both the inner and outer outlets 444, 448 of the nozzle 400, rather than just the outer outlet 448. In operation 510, the valve stem could be position 3 rather than position 2, so that surface material 455 for backfilling is supplied from not just the outer outlet 448 but also the inner outlet 444. Aspects of operation 500 may also differ somewhat from what is shown in FIG. 5 based on the design of the coinjection nozzle of the molding machine. For example, in some embodiments, the coinjection nozzle has an annulus of clearance between the valve stem and each of the intermediate outlet and the outer outlet. Such embodiments can still achieve backfilling of the distal end of their intermediate channels, even if their valve stems cannot mechanically block the intermediate or outer outlets or mechanically trap surface layer material 455 at the distal end of the intermediate channel as described in operation 512.

The inventors have observed that some containers blow-molded from multilayer preforms made by molding machine 100, or by similar injection molding equipment using similar techniques, can delaminate and separate during use. In particular, a thin layer of molding material has been observed to stand away or break away from either or both of the interior surface and exterior surface of blow-molded bottles. Three examples of such defects are shown in FIGS. 11 to 13.

Figure 11:
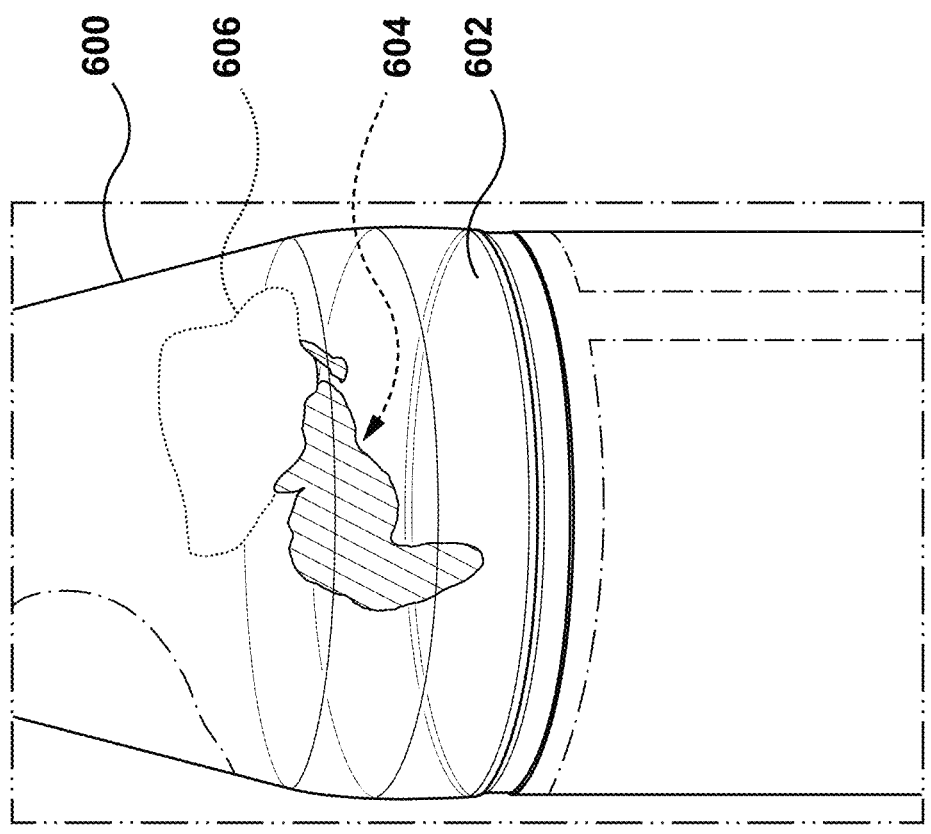
FIG. 11 is a perspective view showing a portion of a plastic bottle having a defect resulting from a defective preform molded by the injection molding machine of FIG. 1.

FIG. 11 is a perspective view showing a portion of a plastic bottle 600 that has been blow-molded from a preform 200. In FIG. 11, the bottle 600 is shown to be partly filled with a consumable beverage 602, such as water. A delaminated portion 604 of molding material that has detached from an area 606 on an interior surface of the bottle wall can be seen stuck to (hanging on) the interior bottle surface. In this example, the delaminated portion 604 is a detached thin film having an irregular shape. The delaminated portion 604 may be considered aesthetically unappealing and could constitute a choking hazard in the event of its inadvertent ingestion by a consumer. Moreover, if the delaminated portion 604 comprises a non-food grade material (e.g. a recycled internal layer material containing impurities), the delaminated portion 604 may contaminate the liquid 602 to the possible detriment of consumer safety.

Figure 12:
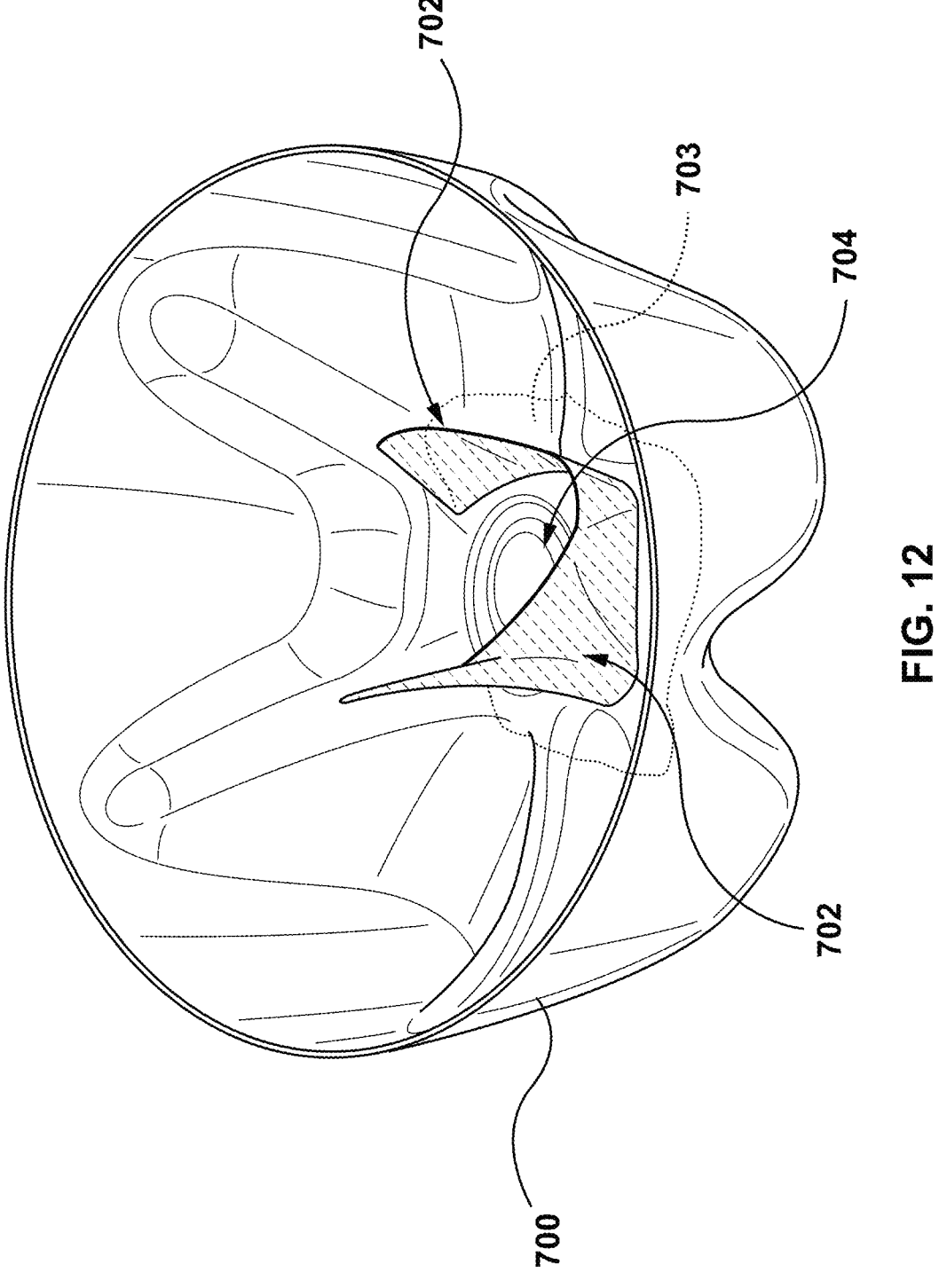
FIG. 12 is a perspective view of a cutaway base portion of another plastic bottle having another defect resulting from a defective preform molded by the injection molding machine of FIG. 1.

FIG. 12 is a perspective view of a cutaway base portion of another plastic bottle 700 having a delaminated portion 702 comprising a thin film that has detached from an area 703 of the interior surface of the bottle 700. In this example, the delaminated portion 702 has a distorted cup shape and remains partially attached to the bottle 700 at a central gate portion 704 of the bottle base. The delaminated portion 702 suffers from at least some of the disadvantages noted above.

Figure 13:
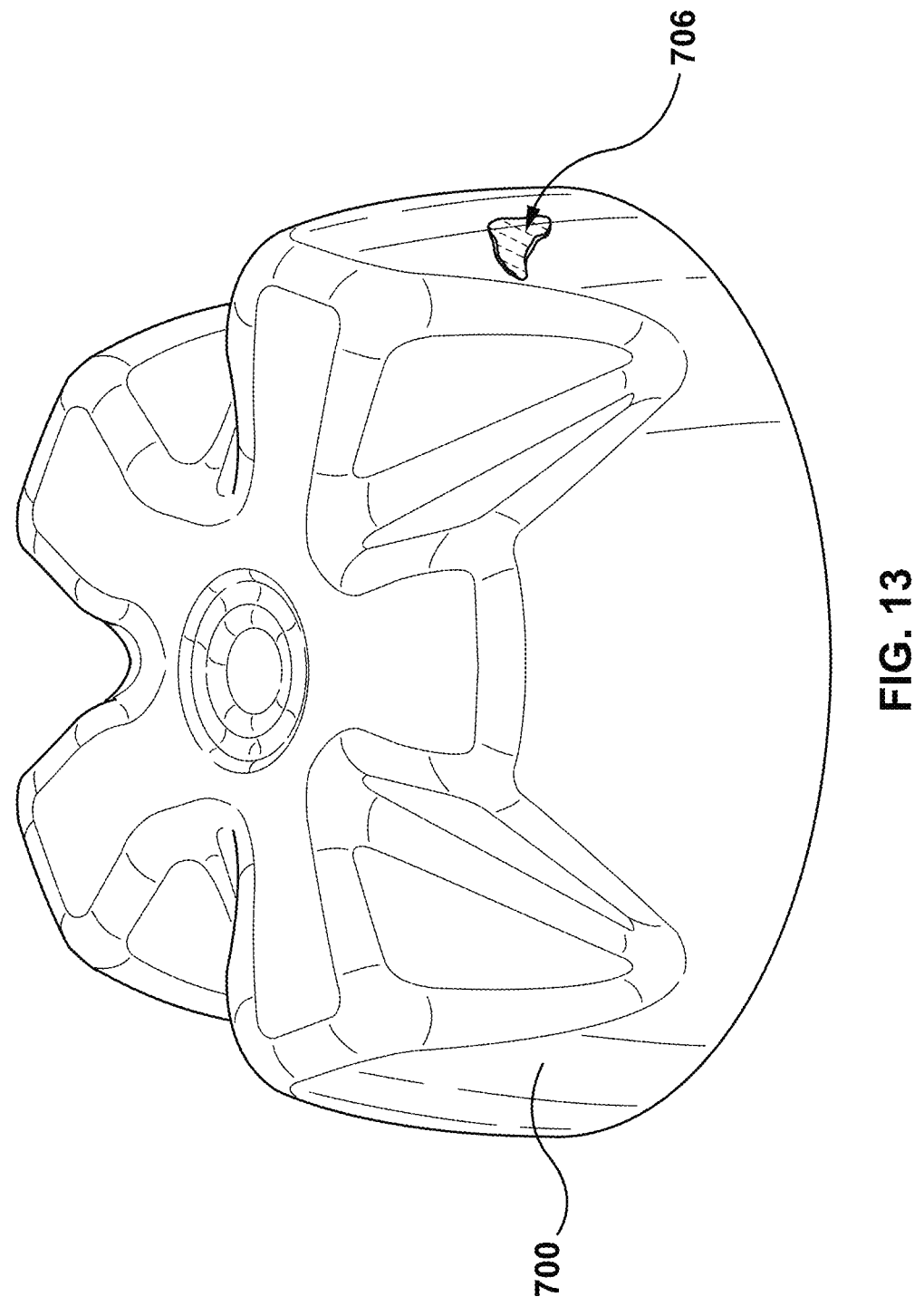
FIG. 13 is a perspective view of an underside of the cutaway base portion of FIG. 12 showing another defect in the base portion of the bottle.

FIG. 13 is a perspective view of an underside of the plastic bottle 700 of FIG. 12 showing yet another delaminated portion 706, which in this case is located on an exterior surface of the bottle 700. Part of the delaminated portion 706 has separated and broken away from the bottle 700. As with the delaminated portions in FIGS. 11 and 12, the delaminated portion 706 of FIG. 13 may be considered aesthetically unappealing. Moreover, any pieces of the delaminated material that have broken away from the bottle 700 may create plastic or micro-plastic pollution that may be harmful to the environment.

The inventors have determined that the delaminated portions 604, 702 and 706 in these examples are comprised of an internal layer molding material. The inventors believe that a previously unrecognized problem with the operation of injection molding machine 100 has resulted in an undesired film of internal layer material on the surface of the bottles 600, 700. More specifically, the inventors believe that, despite the "pullback" operation 510 (FIG. 5) at the conclusion of the injection phase of preform molding, backfilling of the intermediate channel 426 of the hot runner nozzle 400 that molded the preform was at least partially unsuccessful. It is suspected that this may have occurred for reasons such as: an unexpectedly high viscosity of surface layer material 455 causing slower than anticipated material flow rates; an anomalous constriction in the intermediate channel 426 upstream of the distal end to be backfilled; a premature deactivation of the surface layer material injection unit 104 during application of a "hold" or packing pressure to the surface layer material 455; a premature closing of outlet nozzle valve 113; or a combination of these. The foregoing list is not necessarily exhaustive. Regardless of the reason(s) for the defects, it is believed that at least some internal layer material 466 from the distal end of intermediate channel 416 is being entrained into the gate area 430 during the subsequent injection molding cycle and is forming the superfluous surface layer film.

Figures 14, 15:
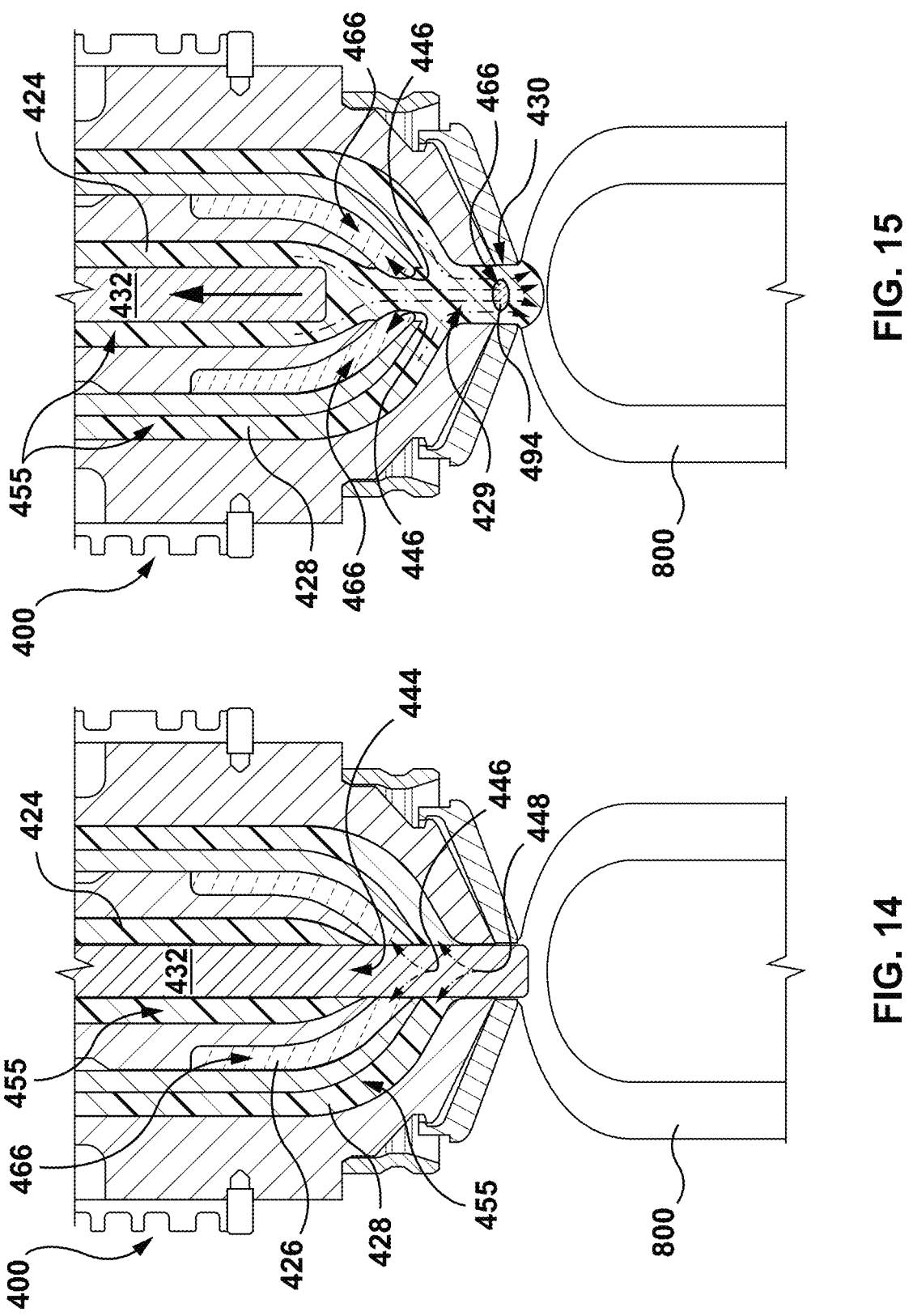
FIGS. 14 and 15 are each schematic diagrams of the nozzle of FIG. 4 and an associated mold cavity in longitudinal cross section at different stages during a single injection molding cycle illustrating a possible cause of the defects shown in FIGS. 11, 12 and 13.

FIGS. 14 to 19 depict operation of molding machine 100 that could result in a superfluous film or skin of internal layer material 466 on a molded preform. Referring to FIGS. 14 and 15, portions of the hot runner nozzle 400 and mold cavity 800 are depicted longitudinal cross section at different points in time at the beginning of an injection molding cycle. As in FIG. 6, the valve stem 432 of FIG. 14 is in Position 0, i.e. the fully closed position, and the mold cavity 800 (shown only in part) is empty. However, FIG. 14 differs from FIG. 6 in that the distal end of intermediate channel 426 of FIG. 14 contains only intermediate layer material 466. In other words, FIG. 14 shows the state of nozzle 400 when the pullback operation 510 of FIG. 5 of the previous molding cycle has failed to achieve the intended result of backfilling the distal end of intermediate channel 426 with a small amount of surface layer material 455, as in FIG. 6.

Turning to FIG. 15, the state of the nozzle 400 and mold cavity 800 during operation 502 of FIG. 5 is depicted. In this operation, the valve stem 432 is moved from Position 0 (the fully closed position) to Position 3 (the fully open position), and injection of the surface layer material 455 by injection unit 104 via both the inner and outer channels 424 and 428 is commenced. Notably, the stream of surface layer material 455 from the inner channel 424 flowing past intermediate outlet 446 has entrained or "dragged" some of the internal layer material 466 from outlet 446 along with it. More specifically, a globule 494 of entrained internal layer material 466 has broken free in this example and has been carried through the material combination area 429 towards mold cavity 800. It will be appreciated that this globule 494 of intermediate layer material 466 may be considered as a contaminant to the initial flow of molding material, which was intended to be exclusively surface layer material 455.

FIGS. 16 to 19 schematically depict a portion of mold cavity 800 corresponding to the curved closed end 204 of the preform 200 in longitudinal cross section at four sequential points in time during operation 502 of FIG. 5. FIGS. 16 to 19 show the manner in which the "fountain flow" effect can transform an entrained globule 494 of internal molding material 466 into a thin film on the internal and external surfaces of the molded preform.

Figures 16, 17, 18, 19:
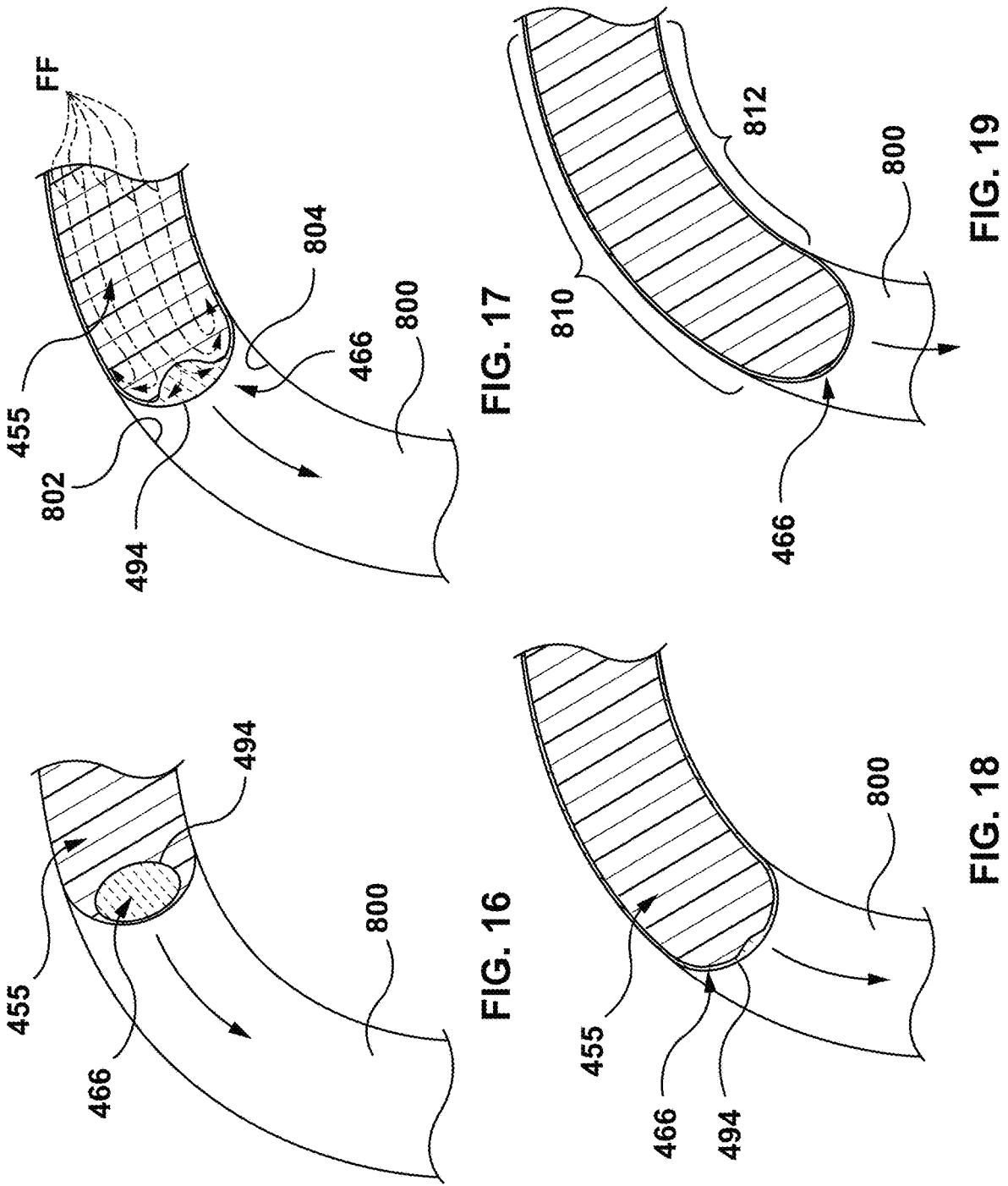
FIGS. 16, 17, 18, and 19 schematically depict a portion of a mold cavity of FIG. 4 in longitudinal cross section at four sequential points in time during molding of a defective multilayer article by the molding machine of FIG. 1.

FIG. 16 shows the mold cavity 800 at a point in time later than what is shown in FIG. 15. As illustrated, the globule 494 of internal layer material 466 has advanced to the leading edge of the advancing flow of surface layer material 455 by virtue of fountain flow, described below.

FIG. 17 shows the mold cavity 800 at a point in time later than what is shown in FIG. 16. The molding material in the center of the mold cavity (i.e. channel) flows faster than the molding material at the perimeter of the mold cavity. Upon reaching the leading edge of the flow, the fastest-flowing central stream of molding material spreads out laterally, or "fountains," to the mold cavity walls. This so-called "fountain flow" is denoted in FIG. 17 by dashed arrows FF. In the result, the internal layer material 466 at the leading edge of the melt flow spreads out laterally, at which time it comes into contact with the cavity surface 802 and the core surface 804 of the mold cavity 800.

Because the cavity and core surfaces 802 and 804 of the mold cavity 800 are cold in comparison to the melted molding material flowing thereinto, whatever molding material first touches those surfaces tends to immediately cool and adhere thereto. In this case, it is the internal layer material 466 fountaining to the cavity walls that is the first to touch those surfaces and adhere thereto. For that reason, a film of the internal layer material 466 begins to form on the interior and exterior surfaces of the preform 200 taking shape within mold cavity 800.

In FIG. 18, molding material has flowed further into mold cavity 800. The globule 494 of internal layer material 466 has significantly flattened in the longitudinal dimension and continues to spread out laterally, adding to the thin film of internal layer material 466 forming on the mold cavity walls.

In FIG. 19, the flow of molding material has advanced still further into the mold cavity 800. At this stage, most of the internal layer material 466 comprises a thin film or "skin" along the mold cavity walls. A substantial portion of the film in this example is located near the gate area of the preform, i.e. along the curved portion 810 of the cavity surface and along the curved portion 812 of the core surface of mold cavity 800.

The precise location and thickness of the superfluous film of internal layer material 466 may vary between embodiments and even between injection molding cycles of a given embodiment, depending upon how much internal layer material 466 has been entrained (see FIG. 15) and how the entrained material 466 is carried into mold cavity 800. In some cases, the film may form primarily or exclusively on the external surface of the preform, i.e. on the cavity side of mold cavity. In other cases, the film may form primarily or exclusively on the internal surface of the preform, i.e. on the core side of mold cavity. The film may be localized to only some portions of a preform and may take on unpredictable shapes. In view of these variables, it may be difficult to detect the presence of the film based on visual inspection alone, particularly when the color of the surface layer material and the color of the internal layer material are similar or identical.

Regardless of the exact location of the superfluous film on the molded preform, subsequent blow molding of the preform into a container (e.g. bottle) may cause the film to delaminate and separate, in whole or in part, from the remainder of the container. Such delamination and separation may be particularly likely when the internal layer material 466 and the surface layer material 455 do not bond well with one another, e.g. as in the case of nylon and PET. In the result, the problems described hereinabove in relation to FIGS. 11-13 may occur. Moreover, because the blow-molding of preforms into containers may occur at a later date and possibly at a different location from the injection molding of the preforms, there is some risk that many batches of defective preforms may be produced before the problem is detected.

Figure 20:
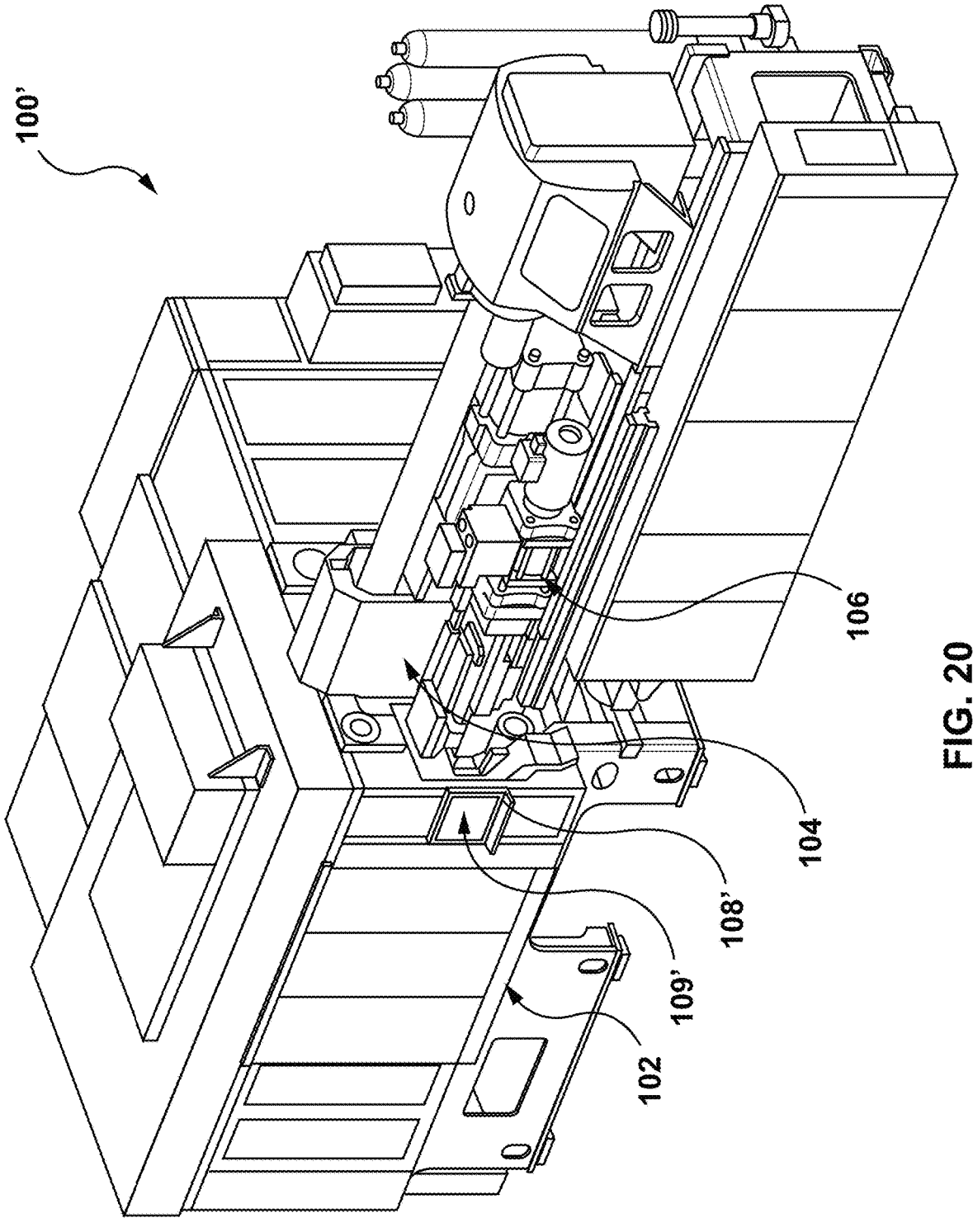
FIG. 20 is a perspective view of an injection molding machine having a reduced risk of producing defective multilayer molded articles of the type described above in comparison to the machine of FIG. 1.

FIG. 20 is a perspective view of an injection molding machine 100' having a reduced risk of producing defective multilayer molded articles of the type described above. The injection molding machine 100' is in many respects similar to the injection molding machine 100 of FIG. 1. For example, the machine 100' is designed to mold the same type of multilayer articles, specifically preform 200 of FIGS. 2 and 3. Some components of molding machine 100' may be identical to those of the above-described molding machine 100. These include the enclosure 102 and at least some of the housed subcomponents (i.e. a clamp unit, a fixed platen, a movable platen, and a mold mounted therebetween, none of which are expressly depicted in FIG. 20), the surface layer material injection unit 104, and the internal layer material injection unit 106. Each of these components of injection molding machine 100' is referenced using the same numerals as were used above to reflect the fact that the components may be identical to their counterparts of machine 100.

Other components of injection molding machine 100' are configured to operate differently than their counterparts of molding machine 100 with a view to reducing the risk of molding defective preforms of the type described above. In this embodiment, these components include controller 108' and HMI 109'. By convention, these components are denoted herein by a variation of the reference numerals that were used to identify their counterparts in molding machine 100, namely the same reference numeral but with an appended apostrophe ("prime") (') symbol.

Figure 22:
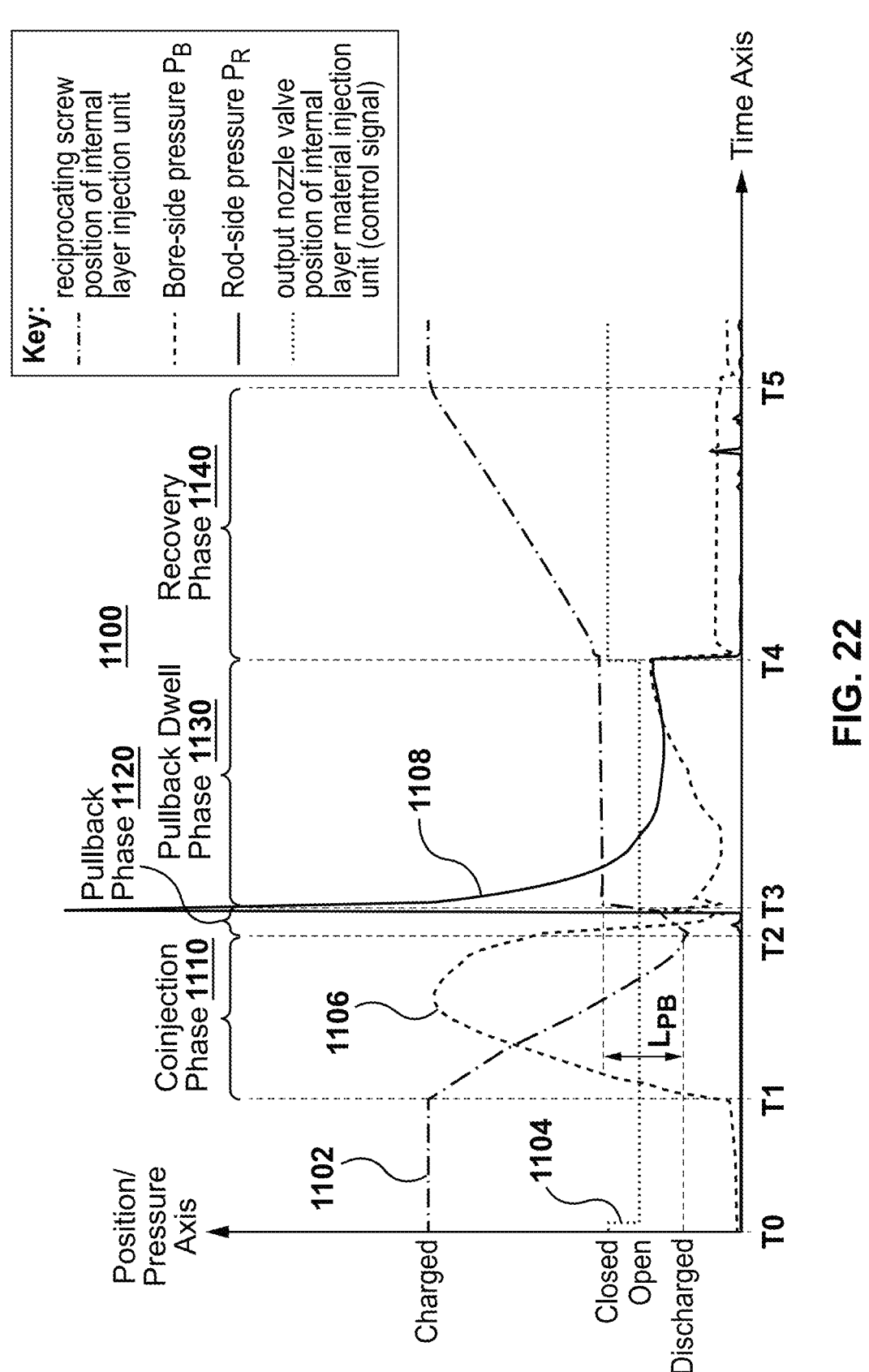
FIG. 22 is a graph showing the position of a driving element of the internal layer material injection unit of the molding machine of FIG. 1 and related parameters during a single injection molding cycle.
Figure 23:
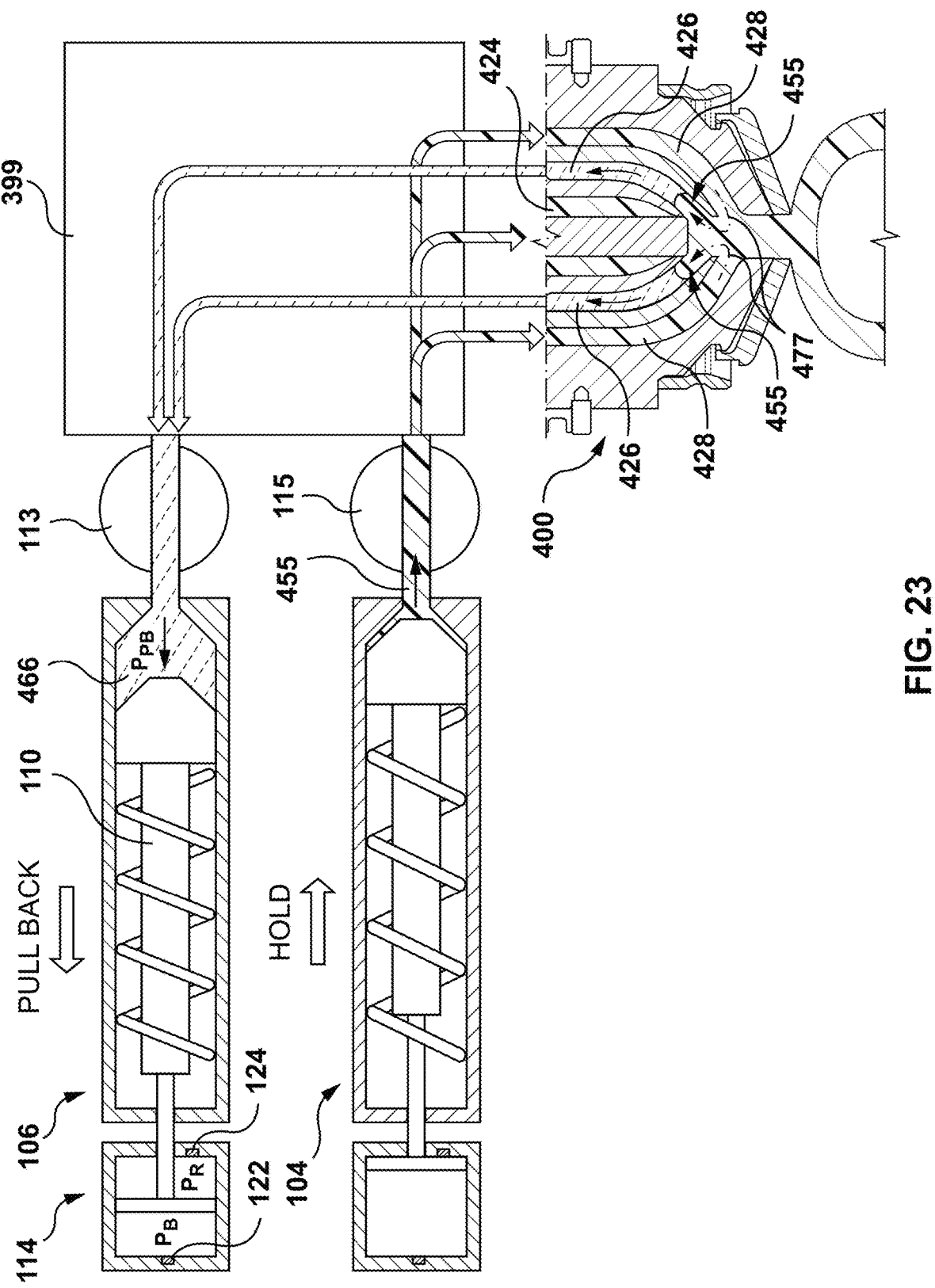
FIG. 23 schematically depicts a portion of the injection molding machine of FIG. 20 during a pullback phase of operation of a molding cycle.
Figure 24:
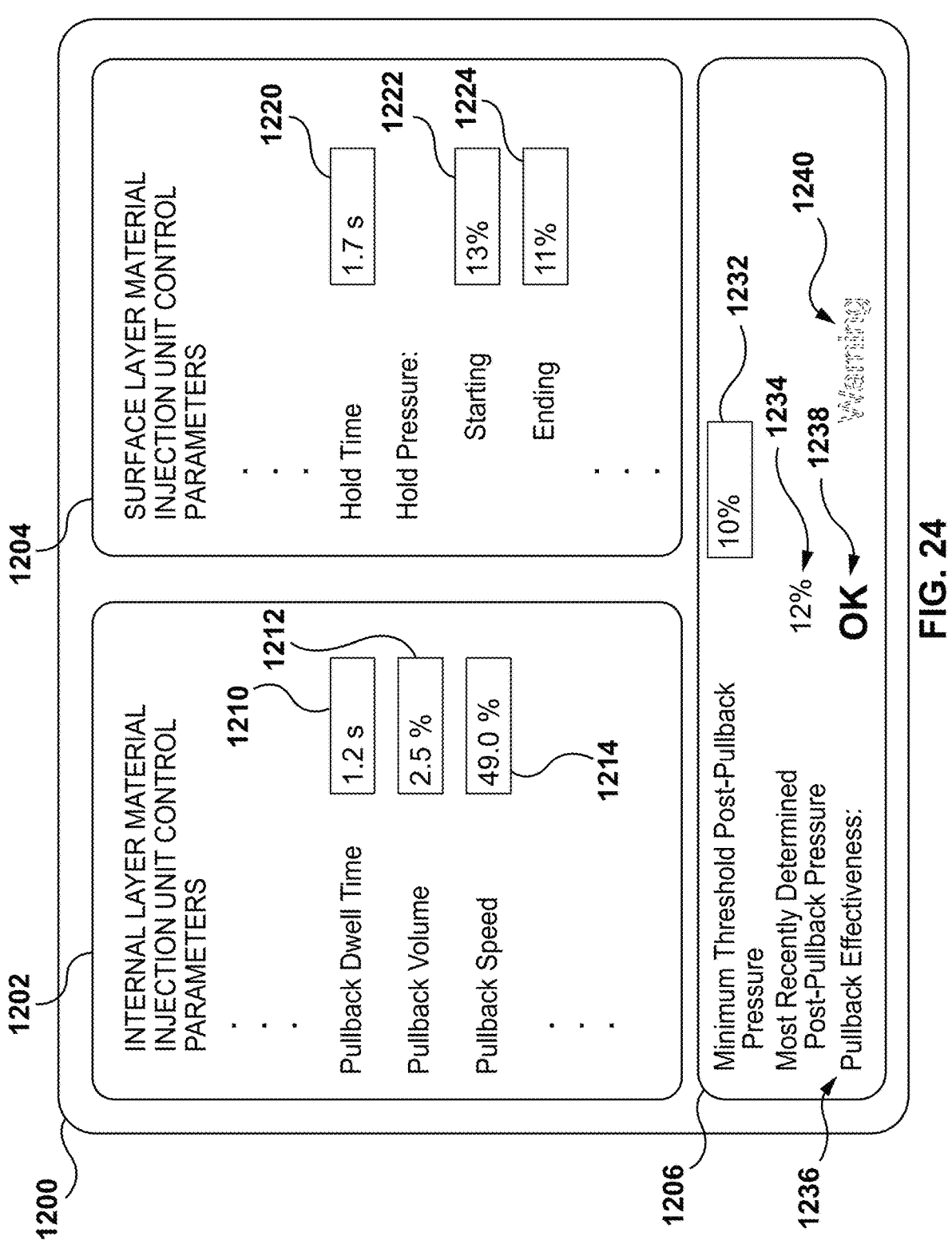
FIG. 24 shows an example graphical user interface that may be displayed on a human-machine interface of the injection molding machine of FIG. 20.

FIG. 21 depicts, in the form of a flowchart, operation 1000 of the controller 108' of the injection molding machine 100' of FIG. 20 for facilitating the molding of a multilayer article with a reduced risk of defects of the type described above. Operation 1000 will be described below in conjunction with FIGS. 22 to 24. FIG. 22 is a graph showing the positions of the output nozzle 113 and driving element (reciprocating screw 110) of the internal layer material injection unit 106 of FIG. 20 over a single injection molding cycle (plots 1104 and 1102 respectively). FIG. 22 also depicts the bore-side pressure $P_B$ and rod-side pressure $P_R$ at injection actuator 114 of injection unit 106 by which the screw 110 is made to reciprocate (plots 1106 and 1108 respectively). FIG. 23 schematically depicts a portion of the injection molding machine 100' during a pullback operation. FIG. 24 shows an example graphical user interface (GUI) 1200 that may be displayed on the human-machine interface (HMI) 109' of FIG. 20 for configuring control parameters and monitoring status of a pullback and/or backfilling operation at molding machine 100'.

In overview, the injection molding machine 100' of FIG. 20 differs from injection molding machine 100 at least in that machine 100' is configured to detect at least one physical parameter indicative of a pressure of the internal layer material 466 at the internal layer material injection unit 106 after a pullback stroke has been effected (referred to herein as the "post-pullback pressure"). The inventors have determined that a lower-than-anticipated post-pullback pressure can indicate inadequate backfilling of the distal end of the internal layer material channel 426 with surface layer material, and thus a higher than normal risk of defective preforms having a superfluous internal layer material film. Accordingly, when the post-pullback pressure is found to be below a minimum threshold pressure, an indicator can be generated at the HMI 109' to apprise an operator of this risk.

In response to the indicator, the operator may manually take remedial action to increase the likelihood of effective backfilling. The remedial action may include one or more of: increasing a pullback dwell time; increasing a pullback volume (stroke length) at the internal layer material injection unit 106; increasing a surface layer material injection pressure and/or hold time; increasing a speed of the pullback stroke at the internal layer material injection unit 106; increasing a speed at which a secondary channel for surface layer material 455 at nozzle 400 is opened at the commencement of pullback (this remedial action presuming that the embodiment in question has such a secondary channel, which is not necessarily present in all embodiments); or a combination of these. The controller 108' may alternatively be operable to automatically take the remedial action(s) or a subset thereof. As a result, machine 100' may produce fewer batches of defective articles than machine 100. Moreover, reliance upon human visual inspection for detecting such defects may be diminished.

It is presumed that, at the commencement of operation 1000 of FIG. 21, injection molding machine 100' is ready to commence an injection molding cycle as described above in connection with FIG. 5. The reciprocating screw 110 of the internal layer material injection unit 106 is accordingly in a charged position, ready to inject a shot of plasticized internal layer material 466, as depicted in FIG. 22 (see e.g. plot 1102, time T0).

Initially, the controller 108' (FIG. 20) causes the surface layer material injection unit 104 to commence injection of surface layer material 455 into the mold cavity 800 via surface layer material channel 428 of coinjection nozzle 400 (operation 1002, FIG. 21). Operation 1002 may for example entail issuance from controller 108' to the surface layer material injection unit 104 of suitable commands and/or control signals for opening output nozzle valve 115 and causing the injection actuator associated with unit 104 to commence injection. The injection of surface layer material 455, which is not expressly depicted in FIG. 22, may be performed according to operation 502 of FIG. 5, described above, and may have the result depicted in FIG. 7, described above. Injection may continue for some period of time before subsequent operation 1004 (described below) is performed.

With injection of surface layer material 455 by surface layer material injection unit 104 ongoing, the controller 108' next causes the internal layer material injection unit 106 to commence injection of internal layer material 466 into the mold cavity 800 via internal layer material channel 426 of the coinjection nozzle 400 (operation 1004, FIG. 21). Analogously to operation 1002, operation 1004 may entail issuance from controller 108' to the internal layer material injection unit 106 of suitable commands and/or control signals for opening output nozzle valve 113 and causing the actuator 114 to commence injection.

In the example embodiment of FIG. 22, it can be seen that the output nozzle valve 113 of internal layer material injection unit 106 opens just after time T0 (see plot 1104, representing a control signal generated by controller 108' to control a position of valve 113). After a delay, injection of the internal layer material 466 commences at time T1 (FIG. 22). The delay ensures sufficient time for the surface layer material injection unit 104 to initially inject enough surface layer material 455 into the mold cavity 800 for the neck finish 206 (FIG. 2) to be comprised only or primarily of surface layer material 455.

In the present embodiment, the injection actuator 114 (FIG. 1A) commences injection by increasing the bore-side pressure $P_B$ sufficiently to begin driving the reciprocating screw 110 forward (see FIG. 22, plot 1106, just before time T1; for clarity, injection by screw 110 is depicted in FIG. 22 as a downward trend of plot 1102 over time). Injection of internal layer material 466 continues throughout coinjection phase 1110, i.e. from time T1 to time T2 (FIG. 22). For clarity, the bore-side pressure $P_B$ begins to drop before the coinjection phase 1110 concludes in the illustrated embodiment because the rate of injection slows towards the end of that phase. The coinjection operation 1002 may be initiated and concluded according to operations 506 and 508 respectively of FIG. 5, described above, and may have a result similar to what is depicted in FIG. 8, described above.

At the conclusion of the coinjection phase 1110 (FIG. 22), the rate at which surface layer material 455 is injected into the mold cavity 800 via channel 428 is significantly slowed (not expressly shown). The reason is that, by this time, the mold cavity 800 has been nearly filled with molding material. In particular, the surface layer material injection unit 104 may enter a "hold phase" of operation. In that phase of operation, the surface layer material injection unit 104 applies sufficient "packing pressure" or "hold pressure" for surface layer material 455 to fill any gaps arising within the mold cavity 800 as the molded article (preform 200) cools, shrinks, and hardens over time.

It will be appreciated that, at this stage, nozzle output valves 113, 115 of injection units 106, 104 respectively are still both in an open state (see FIG. 23). As a result, the surface and internal layer material injection units 104 and 106 are in fluid communication with one another via the surface and internal layer material channels 428, 426 of nozzle 400 of hot runner 399. In other words, a fluid communication path may be considered to exist between the surface and internal layer material injection units 104 and 106 via the hot runner 399, channels 428, 426, and the material combination area 429 of the nozzle 400.

Next, as the surface layer material injection unit 104 continues to apply a hold pressure upon the surface layer material in the surface layer material channel 428, and with the surface layer material injection unit 104 and the internal layer material injection unit 106 in fluid communication with one another as described above, the controller 108' causes a pullback stroke to occur at the internal layer material injection unit 106 (operation 1006, FIG. 21). The purpose of the pullback stroke is to reduce the pressure of the internal layer material 466 in the internal layer material injection unit 106 and downstream thereof. This is done to permit pressurized surface layer material 455 from the surface layer material channel 428 of nozzle 400 to backfill the distal end of the internal layer material channel 426, as earlier described in conjunction with FIG. 10. The effect of the pullback in operation 1006 of the present embodiment of injection molding machine 100' is depicted in FIG. 23.

FIG. 23 schematically depicts a portion of injection molding machine 100' comprising injection units 104, 106, hot runner 399, part of a single coinjection nozzle 400, and part of an associated mold cavity 800. FIG. 23 illustrates the manner in which molding material flows through the illustrated components during operation 1006 of FIG. 21.

In the present embodiment, the pullback of reciprocating screw 110 at internal layer material injection unit 106 is commenced by reducing the bore-side pressure $P_B$ of injection actuator 114 sufficiently to initiate pullback (FIG. 1A). In the depicted embodiment, pullback commences at time T2 and ends at time T3. That interval is referred to as pullback phase 1120 (FIG. 22). During that phase, the reciprocating screw 110 moves in the reverse direction (i.e. left in FIG. 1A) over a pullback stroke length denoted LPB (FIG. 22). The pullback stroke defines a pullback volume $V_{PB}$ equal to the pullback stroke length LPB multiplied by the transversely projected area of the head 121 of screw 110. As illustrated in FIG. 22, the bore-side pressure $P_B$ may be greater than the rod-side pressure $P_R$ at the commencement of pullback (time T2). This is in view of significant plastic pressure pushing back on the tip 121 of screw 110 at that time.

At the conclusion of the pullback phase 1120 (FIG. 22), the injection molding machine 100' of the present embodiment holds the reciprocating screw 110 in a pulled-back position for a period of time referred to as the pullback dwell time or pullback dwell phase 1130 (time T3 to time T4 of FIG. 22). This interval provides time for the plasticized molding materials 455 and 466 within nozzle 400 to react to the reduced pressure of the internal layer material 466 at internal layer material injection unit 106. In particular, the pullback dwell phase 1130 is intended to allow surface layer material 455 from outer channel 428 (and, in some embodiments, inner channel 424, presuming that inner outlet 444 is open at the relevant time), to backfill the distal end of the internal layer material channel 426, e.g. as earlier described in connection with FIG. 10.

It will be appreciated that, if backfilling is successful, e.g. as denoted by arrows 477 in FIG. 23, then the pressure of the internal layer material at the internal layer material injection unit 106 should increase during the pullback dwell phase 1130 by virtue of material flowing upstream within channel 426. Conversely, if backfilling is unsuccessful, then the pressure of the internal layer material 466 at the internal layer material injection unit 106 will not increase by the same extent, or possibly at all, during the pullback dwell phase 1130. As earlier mentioned, possible reasons for unsuccessful backfilling may include: an unexpectedly high viscosity of the surface layer material 455; an anomalous constriction in the intermediate channel 426 upstream of the distal end to be backfilled; a premature deactivation of the surface layer material injection unit 104 that is applying the "hold pressure" to the surface layer material 455; a premature closing of outlet nozzle valve 113; or a combination of these.

To ascertain an effectiveness of the backfilling operation (or, more generally, of the pullback operation), controller 108' triggers the detection of at least one physical parameter indicative of the post-pullback pressure $P_{PB}$ of the internal layer material 466 in the internal layer material injection unit 106. In the present embodiment, this operation is performed just prior to the end of the pullback dwell phase 1130, after a post-pullback delay interval has elapsed (operation 1008, FIG. 21). In the present embodiment, the detection is performed with the surface and internal layer material injection units 104 and 106 still in fluid communication with one another and with the hold pressure still being applied by the surface layer material injection unit 104.

In some embodiments, the detected physical parameter is the post-pullback pressure $P_{PB}$ itself. This may for example be done when the injection unit incorporates a sensor suitable for directly measuring the post-pullback pressure $P_{PB}$, such as a transducer located within the extruder barrel downstream of the driving element for example.

Because the present embodiment lacks such a sensor, the post-pullback pressure $P_{PB}$ is computed based on two detected physical parameters, namely the bore-side pressure $P_B$ and the rod-side pressure $P_R$ at the injection actuator 114, as follows. After the pullback stroke has been completed and the delay interval has elapsed, the $P_B$ and $P_R$ values are dynamically detected using sensors 122 and 124 respectively with the screw 110 in a stationary position. Detection is performed just prior to the closure of the internal layer material injection unit 106 output nozzle valve 113, i.e. just before time T4 in FIG. 22 of the present embodiment. Using these values, the post-pullback pressure $P_{PB}$ is computed according to the equation $P_{PB}=(P_B*A_B-P_R*A_R)/A_{DE}$, where:

$P_B$ is the bore-side pressure at actuator 114

$A_B$ is the projected area of the piston 116 on the bore side of actuator 114

$P_R$ is the rod-side pressure at actuator 114

$A_R$ is the projected area of the piston 116 on the rod side of actuator 114

$A_{DE}$ is the projected area of the driving element (screw 111) of injection unit 106

It will be appreciated that each of the above-referenced projected areas $A_B$, $A_R$, and $A_{DE}$ is projected onto a plane that is transverse to the dimension of reciprocation of the screw 111.

Thereafter, the controller 108' generates an indicator of pullback effectiveness based on a relationship of the post-pullback pressure $P_{PB}$ indicated by the at least one physical parameter and a threshold pressure $P_T$ (operation 1010, FIG. 21). In the present embodiment, the threshold pressure $P_T$ is an empirically predetermined minimum threshold, and the indicator is either a positive indicator or a negative indicator. A positive indicator is generated when the pullback pressure $P_{PB}$ is at least as large as the minimum threshold pressure $P_T$, indicating that backfilling of the distal end of intermediate channel 426 was likely successful. A negative indicator is generated when the pullback pressure $P_{PB}$ is below the minimum threshold pressure $P_T$, indicating that the backfilling is at risk of having been partly or wholly unsuccessful.

In the present embodiment, the indicator generated in operation 1008 is displayed by way of a GUI displayed at HMI 109' (FIG. 20). An example GUI 1200 by which the indicator could be displayed is depicted in FIG. 24. As illustrated, GUI 1200 comprises multiple panels, each displaying a set of GUI constructs for controlling or monitoring associated machine parameters.

A first GUI panel 1202 includes GUI controls (e.g. editable textbox fields) for configuring operational parameters of the internal layer material injection unit 106 at machine 100'. These controls include: a pullback dwell time field 1210 for setting a duration of the pullback dwell phase 1130 (FIG. 22); a pullback volume field 1212 for setting a pullback volume, expressed here as a percentage of a total volume of mold cavity 800; and a pullback speed field 1214 for setting a pullback speed, expressed here as a percentage of maximum pullback speed.

A second GUI panel 1204 includes GUI controls (e.g. editable textbox fields) for configuring operational parameters of the surface layer material injection unit 104 of machine 100'. The controls include a hold time field 1220 for setting a duration of the hold phase and hold pressure fields 1222 and 1224 for setting starting and ending surface layer material pressure levels during the hold phase. In the present embodiment, the starting and ending hold pressures are expressed as percentages of a maximum hold pressure that the surface layer material injection unit 104 is capable of applying. Alternative embodiments could express these values in other ways, e.g. in absolute units such as pounds per square inch.

A third GUI panel 1206 includes GUI constructs for monitoring the effectiveness of the pullback operation 1004 of FIG. 21. The example GUI constructs include: a threshold post-pullback pressure textbox field 1232 for specifying a threshold post-pullback pressure $P_T$; a "current" post-pullback pressure output 1234 showing the most recently detected post-pullback pressure value $P_{PB}$; and a pullback effectiveness indicator 1236 for providing an indication of the effectiveness of the pullback performed in operation 1006 of FIG. 21. In the illustrated embodiment, the threshold pressure and the current pullback pressure output are expressed as percentages of a maximum hold pressure that the surface layer material injection unit 104 is capable of applying. Alternative embodiments could express these values in other ways, e.g. in absolute units such as pounds per square inch.

The GUI 1200 may comprise other GUI panels or constructs, which are omitted from FIG. 24 for brevity.

In the present embodiment, the minimum threshold pressure specified in field 1232 is empirically determined. For example, an operator of injection molding machine 100' may initially closely inspect preforms produced by the machine 100' for evidence of any superfluous internal layer material film as described above. If any such defects are found, then the control parameters within panels 1202 and 1204 may be selectively configured until the defect is no longer evident in subsequent shots (batches).

For example, in one embodiment, the control parameters may be adjusted as follows. If any of the relevant defects are found, the first reconfiguration of machine 100' may be to increase the pullback dwell time (i.e. the post-pullback delay interval referenced in operation 1008, FIG. 21) via field 1210 of FIG. 24. The rationale for this reconfiguration is to provide more time for proper backfilling to occur. For example, this may be sufficient to compensate for a more-viscous-than-anticipated, and therefore slower moving, surface layer molding material 455. In many cases, increasing the pullback dwell time may be considered the best way in which to address any possible defects resulting from incomplete or improper backfilling and should thus be tried first. Operators may consider this remedial action counterintuitive due to an engrained prevailing belief that pullback dwell time should always remain fixed.

Once the machine 100' has been so reconfigured, then another shot or batch of articles may be produced and the articles inspected. If inspection of the articles reveals that the increased pullback dwell time has not fully eliminated the relevant defect(s), then another machine reconfiguration may be performed. In particular, a pullback volume may be increased via appropriate configuration of the pullback volume field 1212 (FIG. 24), which will result in appropriate adjustment of pullback stroke length LPB. The rationale for increasing pullback volume is to lower the pressure at the internal layer material injection unit 106 to promote better backfilling. This may be considered as the next best approach for remedying the defect(s) after increased pullback dwell time.

Another batch of articles may then be molded with the increased pullback volume setting in effect. If inspection of this batch of molded articles again reveals that one or more of the relevant defect(s) remain(s), then a further machine reconfiguration may be performed. At this stage, either or both of the hold time and hold pressure of the surface layer material injection unit 104 may be increased via fields 1220, 1222, and/or 1224 (FIG. 24). The rationale for this reconfiguration is to increase the pressure of the surface layer material 455 at layer material injection unit 104, or a duration of maintaining that pressure at unit 104, to promote improved backfilling. These may be considered as the next best option for reconfiguring machine 100' after increasing pullback dwell time and pullback volume.

Another batch of articles may then be produced with the reconfigured settings in effect. If any defect(s) remain(s), then the machine 100' may be reconfigured by increasing a pullback speed at the internal layer material injection unit 106 via GUI field 1214 (FIG. 24). The rationale for this reconfiguration is to more quickly lower the pullback pressure at the internal layer material injection unit 106 with a view to initiating backfilling more quickly.

If the machine 100' produces a shot of molded articles without the relevant defects after any of the foregoing reconfiguration steps, then further reconfiguration may be unnecessary. At that time, a post-pullback pressure value from the most recent molding cycle may be read from the most recent post-pullback pressure field 1234 of GUI 1200 (FIG. 24). That value may serve as the empirically determined baseline for setting the minimum threshold pressure value via field 1232.

For example, if field 1234 were to indicate that the pullback pressure at the conclusion of the pullback dwell phase 1130 is 10%, that percentage value may be used as a baseline. The minimum pullback pressure threshold $P_T$ may then be set to a value slightly higher than the baseline value (e.g. 12%). The slightly higher value may be considered to provide a "buffer" by which remedial action is triggered before any defective articles are likely to have been molded. In other words, remedial action may be triggered in this example when the most recently detected post-pullback pressure value drops below 12% even if the pressure remains above 10%. This may lower a risk of defective articles more readily than if the most recently detected post-pullback pressure value from field 1234 were itself used as the threshold value in field 1232.

Referring to FIG. 24, when the most recently detected post-pullback pressure (field 1234, FIG. 24) is at least as large as the minimum pressure threshold $P_T$ (field 1232, FIG. 24), then the pullback effectiveness indicator 1236 that is generated in operation 1010 is a positive indicator. In the embodiment depicted in FIG. 24, the positive indicator is a textual "OK" symbol 1238. Other positive indicators that might be used in conjunction with, or alternatively to, that indicator may include other visual indicators, audible warnings, or haptic feedback for example.

If the most recently detected post-pullback pressure value (field 1234, FIG. 24) were lower than the minimum threshold pressure $P_T$ (field 1232, FIG. 24), then a negative indicator of pullback operation effectiveness would be generated in operation 1010 (FIG. 21). In the present embodiment, the negative indicator takes the form a textual "Warning" symbol 1240 (ghosted in FIG. 24) that becomes highlighted or visually noticeable. Other negative indicators that might be used in conjunction with, or alternatively to, that indicator may include other visual indicators, audible warnings, or haptic feedback for example. These indicators may be designed to be particularly noticeable to a human operator as they may indicate a possible fault warranting quick action.

In some embodiments, additional remedial measures may be available for attempting to improve backfill effectiveness. One such remedial measure, alluded to hereinabove, is to increase a speed at which a secondary surface layer material channel of a coinjection nozzle is opened at a commencement of the pullback at internal layer material injection unit 106. For example, in nozzle 400 of FIG. 4, channel 428 may be considered as a primary channel for surface layer material 455, and inner channel 424 may be considered as a secondary channel. A faster rate of opening the secondary channel 424 (e.g. by quicker opening of a mechanical closure, such as quicker retraction of valve stem 432) may more quickly facilitate the flow of a greater volume of surface layer material 455 into the material combination area 429 of the coinjection nozzle compared to the volume of flow from only a single, primary channel for surface layer material 455. This action may alternatively be considered as opening a secondary surface layer material channel at a commencement of pullback or as increasing a speed of opening of a secondary surface layer material channel at a commencement of pullback.

In some embodiments, the controller 108' is operable to automatically trigger at least one remedial action for increasing pullback operation effectiveness when the post-pullback pressure indicated by the at least one physical parameter detected in operation 1008 (FIG. 21) is below the minimum threshold $P_T$. The remedial action(s) may be one or more of the remedial actions described above in the context of setting the minimum pullback pressure threshold, i.e.: (a) increasing a pullback dwell time (post-pullback delay interval) at the internal layer material injection unit 106; (b) increasing a length of the pullback stroke, and thus the pullback volume, at the internal layer material injection unit 106; (c) increasing either or both of a pressure of the surface layer material 455 at the surface layer material injection unit 104 and a hold time of the surface layer material 455 by the surface layer material injection unit 104; (d) increasing a speed of the pullback stroke at the internal layer material injection unit 106; and (e) increasing a speed at which a secondary channel for surface layer material 455 within nozzle 400 (if present) is opened. When two or more of the remedial actions (a) to (e) are triggered, they may be triggered in the sequence (a) to (e), as described above in the context of setting the minimum pullback pressure threshold. In alternative embodiments, the remedial actions may be effected out of sequence.

After automatically effecting one of the remedial actions, the controller 108' may automatically trigger another molding cycle and then automatically check the latest post-pullback pressure value (field 1234, FIG. 24) to determine whether pullback effectiveness has sufficiently improved. The controller 108' may automatically cease taking remedial action once the current pullback pressure reaches or exceeds the predetermined threshold defined via field 1232 (FIG. 24). Visual inspection of the molded articles may become unnecessary, and injection molding machine downtime may accordingly be reduced or avoided.

Various alternative embodiments are contemplated.

The example coinjection nozzle 400 of FIGS. 4 and 10 has two surface layer material channels 424 and 428. In some embodiments, the coinjection nozzle may have only a single surface layer material channel.

The shape and relative positions of the surface layer material channel(s) and the internal layer material channel may vary between embodiments.

In some embodiments, the physical parameter(s) indicative of post-pullback pressure of the internal layer material that is detected in operation 1006 (FIG. 21) may be a force exerted by the internal layer material 466 on the downstream-most end of the driving element 110 (e.g. the tip 121 of the screw) of internal layer material injection unit 106. For example, a force sensor for that purpose could be mounted on the tip of a non-hydraulically actuated reciprocating screw of the internal layer material injection unit. The timing of detecting the physical parameter (force) may be similar to the timing for detecting rod-side and bore-side pressures in the above-described embodiment, i.e. it may be done after a post-pullback delay interval has elapsed. The force may be detected while the surface layer material injection unit and internal layer material injection unit are in fluid communication with one another. The indicator of pullback effectiveness may be generated in operation 1010 (FIG. 21) based on a relationship of the detected force and a minimum threshold force (which may correspond with the minimum threshold pressure $P_T$ described above). For example, a negative indicator, indicating pullback and/or backfill ineffectiveness, may be generated when the detected force is below the minimum threshold force. Conversely, a positive indicator, indicating pullback and/or backfill effectiveness, may be generated when the detected force is at least as large as the minimum threshold force.

In some embodiments, the value that is monitored for assessing pullback effectiveness may not be restricted to a post-pullback pressure $P_{PB}$ of the internal layer material at the internal layer material injection unit. For example, the monitored value may be the post-pullback pressure $P_{PB}$ multiplied by one or more of the parameters that is being used to remedially adjust the post-pullback pressure (e.g. the operative pullback volume $V_{PB}$). In such embodiments, the minimum threshold value may be expressed in similar units, e.g. not purely as a minimum post-pullback pressure $P_T$ but rather as the minimum post-pullback pressure $P_T$ multiplied by a baseline pullback volume $V_B$. If the product of $P_{PB}*V_{PB}$ is determined to be below the threshold value $P_T*V_B$, then this may indicate a higher risk of defects as described above. The rationale for such an approach may be to conveniently monitor, as a combined value, not only the post-pullback pressure at the internal layer material injection unit but also one or more important system parameters whose deviation from expected settings could indicate a potential problem with backfilling.

In operation 1006 (FIG. 21) of the above-described embodiment, the controller 108' causes a pullback of the reciprocating screw 110 of internal layer material injection unit 106 to actively occur, in the sense that the injection actuator 114 actively pulls back the screw. In some embodiments, the pullback may be a passive versus active pullback. In a passive pullback, plastic pressure of the internal layer material 466 downstream of the screw 110 is used to "push" the screw 110 back. Such a passive pullback may for example be caused to occur through appropriate opening of valves at the injection actuator 114 so that the bore-side pressure $P_B$ is lowered sufficiently for the desired pullback to result.

It will be appreciated that the GUI 1200 illustrated in FIG. 24 may vary between embodiments. For example, alternative GUIs may differently arrange the displayed user interface constructs, e.g. across multiple screens, menus, or frames.

In the embodiments described hereinabove, the detecting of a physical parameter indicative of post-pullback pressure in operation 1008 is performed with the surface layer material injection unit 104 and the internal layer material injection unit 106 in fluid communication with one another (i.e. before either of valves 113 or 115 of FIG. 23 is closed). In some embodiments, the detecting may occur immediately after one of the valves, e.g. valve 113, is closed, presuming that the value of the detected parameter will briefly persist after the fluid communication has been severed. However, the reliability of such embodiments may be lower than in embodiments in which the detecting is performed before fluid communication between the surface layer material injection unit 104 and the internal layer material injection unit 106 is severed.

The above-described molding machines 100 and 100' are both for molding multilayer articles that are preforms. In alternative embodiments, the molding machine may be intended for molding other types of multilayer articles, e.g. other types of containers or closures such as lids.

Other modifications may be made within the scope of the following claims.

What is claimed is:

1. An injection molding machine for molding a multilayer article, comprising:
   a coinjection nozzle having a surface layer material channel and an internal layer material channel 426;
   a surface layer material injection unit 104;
   an internal layer material injection unit 106;
   a mold cavity 800; and
   a controller 108'configured to:
   cause the surface layer material injection unit to commence injecting a surface layer material 455 into the mold cavity 800 via the surface layer material channel;
   then cause the internal layer material injection unit to commence injecting an internal layer material 466 into the mold cavity via the internal layer material channel; then during application by the surface layer material injection unit of a hold pressure upon the surface layer material in the surface layer material channel and with the surface layer material injection unit and the internal layer material injection unit in fluid communication with one another via the surface layer material channel and internal layer material channel, cause a pullback stroke to occur at the internal layer material injection unit for reducing a pressure of the internal layer material; then after a delay interval, detect at least one physical parameter indicative of a post-pullback pressure of the internal layer material at the internal layer material injection unit; and generate an indicator of pullback effectiveness based on a relationship of the post-pullback pressure indicated by the at least one physical parameter and a threshold pressure PT.

2. The injection molding machine of claim 1 wherein the controller is configured to perform the detecting of the at least one physical parameter indicative of the post-pullback pressure of the internal layer material at the internal layer material injection unit when the surface layer material injection unit and the internal layer material injection unit are in fluid communication with one another via the surface layer material channel and the internal layer material channel.

3. The injection molding machine of claim 1 further comprising an injection actuator 114 for actuating a driving element 110 of the internal layer material injection unit, the injection actuator having first and second sensors 122, 124 for sensing a bore-side pressure PB and a rod-side pressure PR respectively of the injection actuator, and wherein the detecting of the at least one physical parameter comprises detecting the bore-side pressure and the rod-side pressure of the injection actuator using the first and second sensors respectively while the driving element is stationary; and wherein the controller is further configured to compute the post-pullback pressure based in part on the bore-side pressure and the rod-side pressure.

4. The injection molding machine of claim 1 wherein the controller is configured to generate a negative indicator indicating pullback ineffectiveness based on the post-pullback pressure being below the threshold pressure.

5. The injection molding machine of claim 1 wherein the controller is configured to automatically trigger at least one remedial action for increasing the post-pullback pressure based on the post-pullback pressure being below the threshold pressure, the at least one remedial action being one or more of the following remedial actions: (a) increasing the post-pullback delay interval at the internal layer material injection unit; (b) increasing a length of the pullback stroke at the internal layer material injection unit; (c) increasing either or both of a pressure of the surface layer material at the surface layer material injection unit and a hold time of the surface layer material by the surface layer material injection unit; (d) increasing a speed of the pullback stroke at the internal layer material injection unit.

6. The injection molding machine of claim 5 wherein the at least one remedial action comprises a plurality of the remedial actions (a) to (d).

7. The injection molding machine of claim 6 wherein the triggering of the plurality of the remediation actions (a) to (d) comprises: triggering one of the remedial actions (a) to (d); waiting for the injection molding machine to effect at least one injection molding cycle then repeating the detecting of the physical parameter indicative of the post-pullback pressure of the internal layer material in the internal layer injection unit resulting from the latest pullback stroke; and upon determining that the post-pullback pressure indicated by the at least one physical parameter is below the threshold pressure, triggering another one of the remedial actions (a) to (d) and repeating the waiting and the detecting until the determining determines that the post-pullback pressure of the internal layer material meets or exceeds the predetermined threshold.

8. The injection molding machine of claim 6 wherein the triggering of the plurality of the remedial actions (a) to (d) is performed in the sequence (a) to (d).

9. The injection molding machine of claim 1 wherein the surface layer material channel is a primary channel for conveying surface layer material, wherein the coinjection nozzle also has a secondary channel for conveying surface layer material from the surface layer material injection unit towards the mold cavity, and wherein the controller is configured to increase the post-pullback pressure by automatically increasing a speed at which the secondary channel is opened upon initiation of the pullback stroke based on the post-pullback pressure being below a threshold pressure.

* * * * *